(12) United States Patent
Yin et al.

(10) Patent No.: US 9,185,564 B2
(45) Date of Patent: Nov. 10, 2015

(54) DEVICES FOR SENDING AND RECEIVING FEEDBACK INFORMATION

(75) Inventors: Zhanping Yin, Vancouver, WA (US); Shohei Yamada, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 610 days.

(21) Appl. No.: 13/470,124

(22) Filed: May 11, 2012

(65) Prior Publication Data

US 2013/0301433 A1 Nov. 14, 2013

(51) Int. Cl.
*H04W 16/02* (2009.01)
*H04W 24/00* (2009.01)

(52) U.S. Cl.
CPC .............. *H04W 16/02* (2013.01); *H04W 24/00* (2013.01)

(58) Field of Classification Search
USPC ........................... 370/241, 252, 280, 328, 336
See application file for complete search history.

(56) References Cited

U.S. PATENT DOCUMENTS

| | | | |
|---|---|---|---|
| 2011/0134774 A1* | 6/2011 | Pelletier et al. | 370/252 |
| 2011/0243066 A1* | 10/2011 | Nayeb Nazar et al. | 370/328 |
| 2012/0213170 A1* | 8/2012 | Choi et al. | 370/329 |
| 2012/0269103 A1* | 10/2012 | Papasakellariou et al. | 370/280 |
| 2013/0044700 A1* | 2/2013 | Cheng et al. | 370/329 |

FOREIGN PATENT DOCUMENTS

WO 2012/036479 3/2012

OTHER PUBLICATIONS

3rd Generation Partnership Project (3GPP TS 36.213), Mar. 2011, Release 10, pp. 1-112.*

"Remaining Issues on PDSCH HARQ for CC Specific TDD Configuration," Renesas Mobile Europe, 3GPP TSG RAN WG1 Meeting #68bis, Mar. 26-30, 2012, 4 pages.
3GPP TS 36.211 V9.0.0, "Evolved Universal Terrestrial Radio Access (E-UTRA); Physical Channels and Modulation (Release 9)," Dec. 2009.
3GPP TS 36.213 V8.6.0, "Evolved Universal Terrestrial Radio Access (E-UTRA); Physical Layer Procedures (Release 8)," Mar. 2009.
MCC Support, "Final Report of 3GPP TSGN RAN WG1 #66bis v1.1.0," 3GPP TSG RAN WG1 meeting #67, R1-114352, Nov. 2011.
MCC Support, "Final Report of 3GPP TSG RAN WG1 #67 v1.0.0," 3GPP TSG RAN WG1 Meeting #68, R1-120001, Feb. 2012.
MCC Support, "Final Report of 3GPP TSG RAN WG1 #68, v1.0.0," 3GPP Tsg Ran WG1 Meeting #68bis, R1-120951, Mar. 2012.
MCC Support, "Draft Report of 3GPP TSG RAN WG1 #68 v0.1.0," 3GPP TSG RAN WG1 Meeting #69, R1-12xxxx, Mar. 2012.

* cited by examiner

*Primary Examiner* — Michael Thier
*Assistant Examiner* — Prince A Mensah
(74) *Attorney, Agent, or Firm* — Keating & Bennett, LLP

(57) ABSTRACT

A User Equipment (UE) for sending feedback information is described. The UE includes a processor and instructions stored in memory that is in electronic communication with the processor. The UE determines a primary cell (PCell) configuration. The UE also determines a secondary cell (SCell) configuration. The SCell configuration is different from the PCell configuration. The UE further determines a feedback parameter $M_c$ based on the PCell configuration and the SCell configuration. $M_c$ indicates a number of subframes that require Physical Downlink Shared Channel (PDSCH) Hybrid Automatic Repeat Request Acknowledgement/Negative Acknowledgement (HARQ-ACK) association for a cell c in a given uplink subframe. The UE also determines SCell HARQ-ACK information. The UE additionally sends the SCell HARQ-ACK information based on the feedback parameter.

4 Claims, 15 Drawing Sheets

DEVICES FOR SENDING AND RECEIVING FEEDBACK INFORMATION

TECHNICAL FIELD

The present disclosure relates generally to communication systems. More specifically, the present disclosure relates to devices for sending and receiving feedback information.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
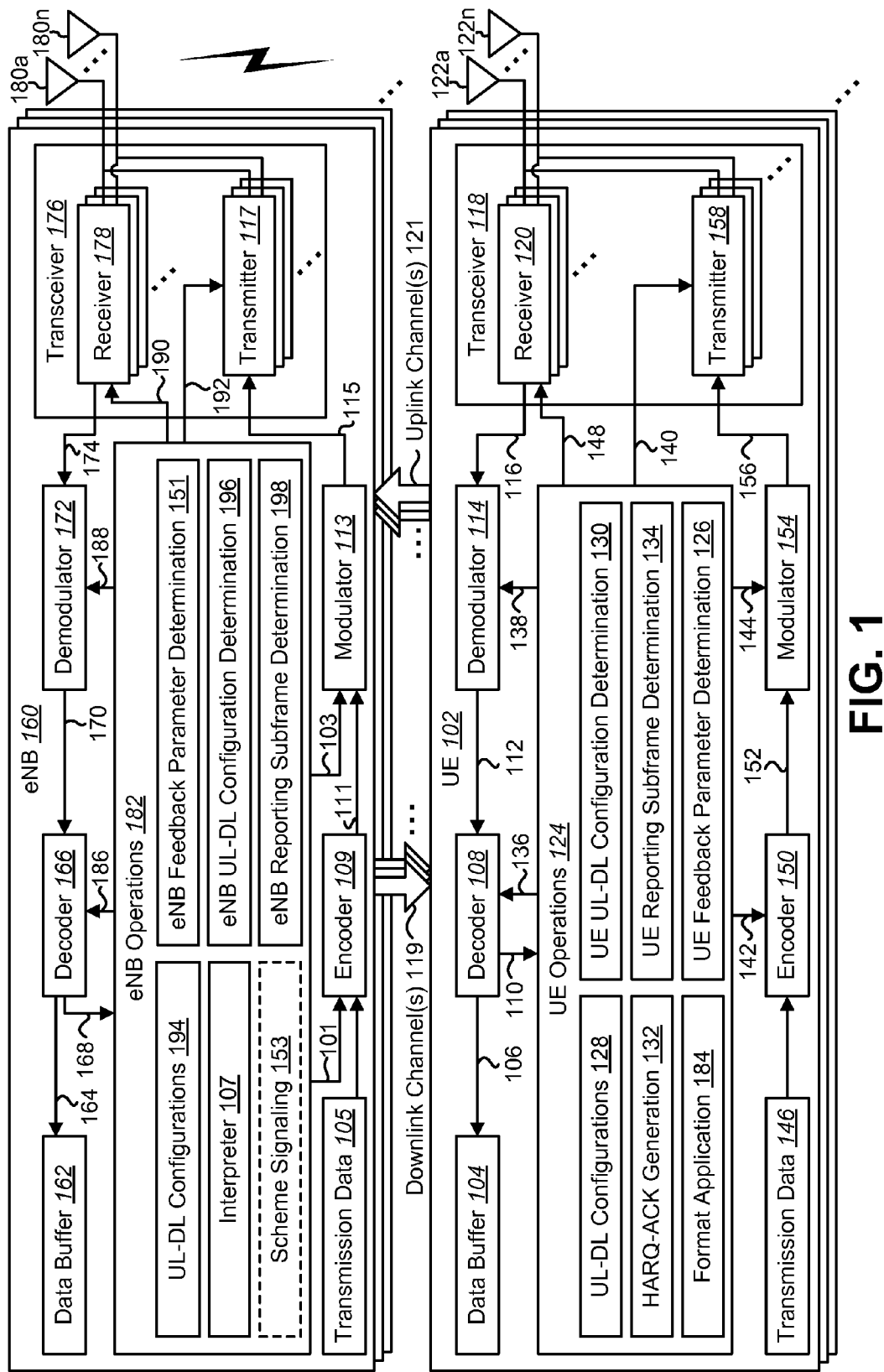
FIG. 1 is a block diagram illustrating one configuration of one or more evolved Node Bs (eNBs) and one or more User Equipments (UEs) in which systems and methods for sending and receiving feedback information may be implemented.

A UE for sending feedback information is described. The UE includes a processor and instructions stored in memory that is in electronic communication with the processor. The UE determines a PCell configuration. The UE also determines a SCell configuration. The SCell configuration is different from the PCell configuration. The UE further determines a feedback parameter $M_c$ based on the PCell configuration and the SCell configuration. $M_c$ indicates a number of subframes that require PDSCH HARQ-ACK feedback for a cell c in a given uplink subframe. The UE additionally determines SCell HARQ-ACK information. The UE also sends the SCell HARQ-ACK information based on the feedback parameter.

The feedback parameter may indicate a number of elements in a set K. The set K may include at least one PDSCH HARQ-ACK association k. The feedback parameter may be determined for an SCell that is cross-carrier scheduled.

Determining the feedback parameter may be based on a reference parameter $M_{Ref}$. $M_{Ref}$ may indicate a number of subframes with a PDSCH HARQ-ACK association for a reference configuration. The reference parameter may be set to a PCell parameter $M_{PCell}$ if a first set of downlink subframes for the SCell configuration is a subset of a second set of downlink subframes for the PCell configuration. $M_{PCell}$ may indicate a number of subframes with a PDSCH HARQ-ACK association for the PCell configuration.

The reference parameter may be set to an SCell parameter $M_{SCell}$ if a second set of downlink subframes for the PCell configuration is a subset of a first set of downlink subframes for the SCell configuration. $M_{SCell}$ may indicate a number of subframes with a PDSCH HARQ-ACK association for the SCell configuration.

The reference parameter may be set to a predetermined parameter $M_{RefConf}$ if a first set of downlink subframes for the SCell configuration is neither a subset nor a superset of a second set of downlink subframes for the PCell configuration. $M_{RefConf}$ may indicate a number of subframes with a PDSCH HARQ-ACK association for the reference configuration.

The feedback parameter may be equal to $M_{Eff} = M_{Ref} - m$. $M_{Eff}$ may be a number of downlink subframes and special subframes with PDSCH HARQ-ACK associations for an SCell following a reference configuration that excludes conflicting subframes, $M_{Ref}$ may be a number of subframes with PDSCH HARQ-ACK associations for the reference configuration and m may be a number of the conflicting subframes that are downlink subframes and special subframes in the reference configuration and uplink subframes in the SCell configuration.

Determining the feedback parameter may be based on a scheduling cell parameter $M_{SchedulingCell}$ or an effective scheduling cell parameter $M_{Eff\_SchedulingCell}$ for an SCell that is cross-carrier scheduled. $M_{SchedulingCell}$ may be a number of subframes with a PDSCH HARQ-ACK association for a scheduling cell configuration and $M_{Eff\_SchedulingCell}$ may be a number of subframes with a PDSCH HARQ-ACK association for a scheduling cell configuration excluding conflicting subframes. Or, if a scheduling cell is not a PCell, a PDSCH reporting reference configuration of the scheduling cell may be used instead of the scheduling cell configuration.

The UE may determine a number of downlink subframes for HARQ-ACK feedback multiplexing for at least one cell based on the feedback parameter. The feedback parameter may be based on a reference parameter. The feedback parameter may be based on a reference parameter and a number of conflicting subframes.

If the PCell configuration is uplink-downlink configuration 0, then the UE may apply Physical Uplink Control Channel (PUCCH) Format 3 and HARQ-ACK multiplexing for one or more cells. If the PCell configuration is uplink-downlink configuration 0 and if there are only two configured serving cells, then, for HARQ-ACK reporting in subframes 3 and 8, the UE may apply one or more of PUCCH Format 1a, PUCCH Format 1b and PUCCH Format 1b with channel selection.

The UE may receive a scheme. Determining the feedback parameter may be further based on the scheme.

An eNB for receiving feedback information is also described. The eNB includes a processor and instructions stored in memory that is in electronic communication with the processor. The eNB signals a PCell configuration. The eNB also signals an SCell configuration. The SCell configuration is different from the PCell configuration. The eNB determines a feedback parameter $M_c$ based on the PCell configuration and the SCell configuration. $M_c$ indicates a number of subframes that require PDSCH HARQ-ACK feedback for a cell c in a given uplink subframe. The eNB additionally receives SCell HARQ-ACK information based on the feedback parameter. The eNB may also interpret the SCell HARQ-ACK information based on at least one of the group consisting of PUCCH Format 3, PUCCH Format 1a, PUCCH Format 1b and PUCCH Format 1b with channel selection. The eNB may signal a scheme.

Determining the feedback parameter may be based on a reference parameter $M_{Ref}$. $M_{Ref}$ may indicate a number of subframes with a PDSCH HARQ-ACK association for a reference configuration.

The feedback parameter may be equal to $M_{Eff}=M_{Ref}-m$. $M_{Eff}$ may be a number of downlink subframes and special subframes with PDSCH HARQ-ACK associations for an SCell following a reference configuration that excludes conflicting subframes, $M_{Ref}$ may be a number of subframes with PDSCH HARQ-ACK associations for the reference configuration and m may be a number of the conflicting subframes that are downlink subframes and special subframes in the reference configuration and uplink subframes in the SCell configuration.

Determining the feedback parameter may be based on a scheduling cell parameter $M_{SchedulingCell}$ or an effective scheduling cell parameter $M_{Eff\_SchedulingCell}$ for an SCell that is cross-carrier scheduled. $M_{SchedulingCell}$ may be a number of subframes with a PDSCH HARQ-ACK association for a scheduling cell configuration and $M_{Eff\_SchedulingCell}$ may be a number of subframes with a PDSCH HARQ-ACK association for a scheduling cell configuration excluding conflicting subframes. Or, if a scheduling cell is not a PCell, a PDSCH reporting reference configuration of the scheduling cell may be used instead of the scheduling cell configuration.

A method for sending feedback information by a UE is also described. The method includes determining a PCell configuration. The method also includes determining an SCell configuration. The SCell configuration is different from the PCell configuration. The method may further include determining a feedback parameter $M_c$ based on the PCell configuration and the SCell configuration. $M_c$ indicates a number of subframes that require PDSCH HARQ-ACK feedback for a cell c in a given uplink subframe. The method also includes determining SCell HARQ-ACK information. The method additionally includes sending the SCell HARQ-ACK information based on the feedback parameter.

A method for receiving feedback information an eNB is also described. The method includes signaling a PCell configuration. The method also includes signaling a SCell configuration. The SCell configuration is different from the PCell configuration. The method further includes determining a feedback parameter $M_c$ based on the PCell configuration and the SCell configuration. $M_c$ indicates a number of subframes that require PDSCH HARQ-ACK feedback for a cell c in a given uplink subframe. The method additionally includes receiving SCell HARQ-ACK information based on the feedback parameter.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a PDSCH. "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe devices for sending and receiving feedback information. This may be done in the context of carrier aggregation. For example, PDSCH HARQ-ACK reporting for carrier aggregation (e.g., inter-band carrier aggregation) with different Time-Division Duplexing (TDD) UL-DL configurations is described.

In accordance with the systems and methods disclosed herein, different TDD UL-DL configurations may be used for inter-band carrier aggregation. In other words, the cells or component carriers (CCs) in different bands may have different UL-DL configurations. Carrier aggregation refers to the concurrent utilization of more than one carrier. In one example, carrier aggregation may be used to increase the effective bandwidth available to a UE. One type of carrier aggregation is inter-band carrier aggregation. In inter-band carrier aggregation, multiple carriers from multiple bands may be aggregated. For example, a carrier in a first band may be aggregated with a carrier in a second band. As used herein, the term "concurrent" and variations thereof may denote that at least two events may overlap each other in time, and may or may not mean that the at least two events begin and/or end at precisely the same time. The systems and methods disclosed herein may not be restricted to inter-band carrier aggregation and may also be applied to intra-band carrier aggregation.

As used herein, the term "configuration" may refer to an UL-DL configuration. An UL-DL configuration specifies whether each subframe within a radio frame is an UL subframe, a DL subframe or a special subframe. More detail regarding UL-DL configurations is given in connection with Table (1) below. A "PCell configuration" may refer to an UL-DL configuration that corresponds to a PCell. For example, a PCell configuration is an UL-DL configuration applied by the eNB and UE for communications in the PCell. The PCell configuration may be signaled to a UE by an eNB in a SystemInformationBlockType1 (SIB-1). The SIB-1 may be transmitted (by an eNB, for example) on a broadcast control channel as a logical channel. An "SCell configuration" may refer to an UL-DL configuration that corresponds to an SCell. For example, an SCell configuration is an UL-DL configuration applied by the eNB and UE for communications in an SCell. An SCell configuration may be signaled to a UE with carrier aggregation by an eNB in dedicated Radio Resource Control (RRC) signaling. The dedicated RRC signaling may be transmitted (by an eNB, for example) on a dedicated control channel as a logical channel. Additionally or alternatively, an eNB may send the SCell configuration in SIB-1 for UEs using the cell as a PCell. Typically, the eNB sends the same system information parameters between the SIB-1 for UEs using the cell as the PCell and the dedicated RRC signaling for UEs with carrier aggregation, though this is not strictly required. However, the parameters that are cell-specific parameters are signaled to a UE with carrier aggregation via dedicated RRC signaling and may be signaled to UEs using the cell as a PCell may be referred to as an SCell SIB-1 configuration or an SCell configuration.

PDSCH HARQ-ACK may be reported on the uplink. In one approach, the PCell configuration may be selected as a reference configuration. SCell PDSCH HARQ-ACK may be mapped to a PCell UL subframe allocation. An "UL subframe allocation" may refer to one or more subframes that are configured for UL transmissions. For example, a PCell UL subframe allocation may specify one or more UL subframes in accordance with the PCell configuration. A "DL subframe allocation" may refer to one or more subframes that are configured for DL transmissions. For example, a PCell DL subframe allocation may specify one or more DL subframes in accordance with the PCell configuration.

Carrier aggregation may assume that the same eNB scheduler manages communication resources for the PCell and SCell(s). Thus, the scheduler may know the actual configuration of each cell. The UEs may be informed (by an eNB, for example) of the actual UL-DL configuration of each aggregated cell, particularly if a cell has a different UL-DL configuration from the PCell.

In some implementations, the systems and methods disclosed herein may enable PDSCH HARQ-ACK reporting and multiplexing on PUCCH Format 3 for carrier aggregation with different Time-Division Duplexing (TDD) Uplink-Downlink (UL-DL) configurations. TDD UL-DL configurations may be referred to as "UL-DL configurations" or a similar term herein for convenience. Additionally, an UL-DL configuration corresponding to a PCell may be referred to as a "PCell configuration" and an UL-DL configuration corresponding to an SCell may be referred to as an "SCell configuration" for convenience herein. Furthermore, "uplink" may be abbreviated as "UL" and "downlink" may be abbreviated as "DL" for convenience herein.

Enhanced carrier aggregation (eCA) may include inter-band carrier aggregation (CA) with different UL-DL configurations. For example, the systems and methods disclosed herein may enable inter-band CA with different UL-DL configurations, which may be supported in Rel-11. Furthermore, predetermined PDSCH HARQ-ACK reporting associations may be utilized in accordance with the systems and methods disclosed herein.

In LTE Release-8, 9 and 10 specifications, TDD CA only allows cells with the same UL-DL configuration. Therefore, the same set of parameters is utilized to determine the HARQ-ACK bits of all cells. However, for TDD CA with different UL-DL configurations, different sets of parameters may be utilized for different cells. Thus, new issues arise concerning multiplexing HARQ-ACK bits on different PUCCH formats (e.g., PUCCH Format 3 and PUCCH Format 1a/1b with channel selection).

However, a detailed PUCCH format for PDSCH HARQ-ACK reporting has not been discussed in 3GPP meetings. Reusing Release-10 specifications and adding new extensions may address these issues.

The systems and methods disclosed herein provide approaches for multiplexing and reporting HARQ-ACK bit(s) for CA with different UL-DL configurations. Due to different UL-DL configurations, different parameters may be used for different cells. Approaches for determining these parameters are provided herein. In particular, issues and solutions are described herein for the following cases.

If PUCCH Format 3 is configured for CA with different UL-DL configurations, different sets of parameters may be utilized for different cells. Furthermore, the parameters of an SCell may follow a reference configuration. Depending on the PCell and SCell configuration combinations, the reference configuration may be the PCell configuration, the SCell configuration or a reference configuration that is neither the PCell configuration nor the SCell configuration. In the case where the SCell is allocated with an UL subframe and the reference configuration is allocated with a DL subframe, rules may be specified whether to include this subframe in the HARQ-ACK report or not.

Furthermore, when a PCell is configured with UL-DL configuration 0, there may be uplink subframes where no HARQ-ACK is reported corresponding to the PCell and only HARQ-ACK bits from one or more SCells may be reported. Current Release-10 specifications cannot fully support this case. Special handling may be needed.

eCA may support different TDD UL-DL configurations on different bands. The CA with different UL-DL configurations may also be referred to as inter-band carrier aggregation. For simplicity, an UL-DL configuration of a PCell may be referred to as a PCell configuration. Furthermore, an UL-DL configuration of an SCell may be referred to as an SCell configuration. As used herein, a "conflicting subframe" may be a subframe that has different subframe types (e.g., downlink or special subframes versus uplink subframes) between configurations.

When carrier aggregation is employed in LTE Release 10, HARQ-ACK corresponding to transmitted downlink communications may be transmitted on the PUCCH, according to one of two approaches. In one approach, HARQ-ACK may be transmitted based on Format 1a/1b with "channel selection" or based on Format 3. Some implementations of the systems and methods disclosed herein may utilize Format 1a/1b with channel selection or Format 3, where carriers being aggregated have different UL-DL configurations. This may be referred to as inter-band CA with different TDD UL-DL configurations.

TDD UL-DL configurations 0-6 are given below in Table (1) (from Table 4.2-2 in 3GPP TS 36.211). UL-DL configurations with both 5 millisecond (ms) and 10 ms downlink-to-uplink switch-point periodicity may be supported. In particular, seven UL-DL configurations are specified in 3GPP specifications, as shown in Table (1) below. In Table (1), "D" denotes a downlink subframe, "S" denotes a special subframe and "U" denotes an UL subframe.

TABLE (1)

| TDD UL-DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE (1)-continued

| TDD UL-DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The systems and methods disclosed herein may support inter-band carrier aggregation CA of TDD with different UL-DL configurations. In some implementations, PUCCH may be transmitted on the PCell only and no new HARQ-ACK timing table may be utilized beyond those already defined in Rel-8, 9 and 10 specifications. The PCell may utilize the same timing as provided in Rel-8, 9 and 10 specifications, which includes PDSCH HARQ-ACK timing, PUSCH scheduling and PUSCH HARQ-ACK timing.

The PDSCH HARQ-ACK timing issue may be categorized into three cases. In a first case (e.g., "case A"), where the set of DL subframes indicated by the SCell configuration is a subset of the DL subframes indicated by the PCell configuration, the SCell may follow the PCell configuration.

PDSCH HARQ-ACK reporting for the other cases (e.g., "case B" and "case C") may be implemented as follows. For the second case (e.g., "case B"), at least in the context of self-scheduling and full duplex communications, where the set of DL subframes indicated by the PCell configuration is a subset of the DL subframes indicated by the SCell configuration, the SCell may follow the SCell configuration. In some implementations, the same rule may be applied in the context of half duplex communications. The systems and methods disclosed herein may present approaches for the cross-carrier scheduling case.

For the third case (e.g., "case C"), at least in the context of self-scheduling and full duplex communications, where the set of DL subframes indicated by the SCell configuration is neither a subset of nor a superset of the DL subframes indicated by the PCell configuration, the SCell may follow a reference configuration as illustrated in Table (2) below. The reference configuration may be selected based on overlapping UL subframes in both the PCell and the SCell. In some implementations, the same rule may be applied in the context of half duplex communications. The systems and methods disclosed herein may present approaches for the cross-carrier scheduling case.

Table (2) below illustrates UL-DL configurations for PDSCH HARQ-ACK reporting. In particular, the columns illustrate PCell (TDD UL-DL) configurations 0-6, while the rows illustrate SCell (TDD UL-DL) configurations 0-6. The grid intersecting the PCell configurations and SCell configurations illustrates the PDSCH HARQ-ACK timing corresponding to an UL-DL configuration that the SCell follows based on the case. In Table (2), "A" represents case A described above. In case A, SCell PDSCH HARQ-ACK timing follows the PCell configuration. In Table (2), "B" represents case B as described above. In case B, SCell PDSCH HARQ-ACK timing follows the SCell configuration. In Table (2), "C" represents case C as described above. In case C, SCell PDSCH HARQ-ACK timing follows a reference (TDD UL-DL) configuration indicated by the number that accompanies an instance of "C" in Table (2). In other words, the number in the grid in Table (2) is the reference configuration that SCell PDSCH HARQ-ACK timing follows in instances of case C. For example, when the PCell configuration is UL-DL configuration 3 and the SCell configuration is UL-DL configuration 1, SCell PDSCH HARQ-ACK timing may follow configuration 4.

TABLE (2)

| SCell PDSCH HARQ-ACK Timing Follows | PCell SIB-1 UL-DL Configuration | | | | | | |
|---|---|---|---|---|---|---|---|
| Configuration # | 0 | 1 | 2 | 3 | 4 | 5 | 6 |
| SCell SIB-1 UL-DL Configuration | 0 |   | A | A | A | A | A | A |
| | 1 | B |   | A | C, 4 | A | A | B |
| | 2 | B | B |   | C, 5 | C, 5 | A | B |
| | 3 | B | C, 4 | C, 5 |   | A | A | B |
| | 4 | B | B | C, 5 | B |   | A | B |
| | 5 | B | B | B | B | B |   | B |
| | 6 | B | A | A | A | A | A |   |

In LTE Rel-10, a UE that supports aggregating more than one serving cell with frame structure type 2 is configured by higher layers. The UE may be configured to use either PUCCH Format 1b with channel selection or PUCCH Format 3 for transmission of HARQ-ACK when configured with more than one serving cell with frame structure type 2. The UE may be configured by higher layers to use HARQ-ACK bundling, to use PUCCH Format 1b with channel selection (according to the set of Tables 10.1.3-2, 3 or 4 or according to the set of Tables 10.1.3-5, 6 or 7 of 3GPP TS 36.213, for example) or to use PUCCH Format 3 for transmission of HARQ-ACK when configured with one serving cell with frame structure type 2. The use of Tables 10.1.3-2, 3 or 4 or the set of Tables 10.1.3-5, 6 or 7 of 3GPP TS 36.213 may be configured by higher layer signaling.

More detail is given hereafter regarding approaches for PDSCH HARQ-ACK reporting a PUCCH with different UL-DL configurations in accordance with the systems and methods disclosed herein. In LTE Rel-10 TDD CA, all cells have the same UL-DL configuration. Therefore, when determining the HARQ-ACK reporting, the same parameters are applied to all cells. In eCA, however, TDD with different configurations is supported. Thus, different cells may have different sets of parameters M. Utilizing different sets of parameters M introduces design challenges. Approaches for determining the parameter M in CA with different UL-DL configurations (e.g., eCA) are described as follows.

In LTE Rel-10, M is the number of elements in the set K defined in Table (3) below (from Table 10.1.3.1-1 of 3GPP TS 36.213) associated with subframe n and the set K. In other words, a downlink association set index for TDD may be defined in Table (3) as K:{$k_0, k_1, \ldots, k_{M-1}$}, where M is a number of elements in the set K. The downlink association set depends on the UL-DL configuration, as given in Table (3) below. It should also be noted that PDSCH HARQ-ACK timing may be based on one or more TDD UL-DL configurations in TDD CA with different configurations (as illustrated in Table (2), for example).

A PDSCH HARQ-ACK association means the linkage between a PDSCH transmission and its HARQ-ACK feedback in an uplink subframe. For an uplink subframe n, the downlink association set index for TDD is defined in Table 10.1.3.1-1, which is illustrated as Table (3) below. Thus, a PDSCH transmission in a subframe (n−k) where k belongs to the association set index K:{$k_0, k_1, \ldots, k_{M-1}$}, the corresponding HARQ-ACK of the PDSCH is reported in the associated uplink subframe n. An entry in Table (3) defines a downlink association (e.g., a PDSCH HARQ-ACK association). The set K defines the PDSCH HARQ-ACK association set for a given uplink.

TABLE (3)

| UL-DL Config- uration Number | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In eCA, TDD with different configurations is supported. Thus, different cells may have different sets of parameters, such as M. This presents design challenges.

For self scheduling, each cell schedules the PDSCH transmission by the PDCCH or by semi-persistent scheduling (SPS) of the same cell. The PDSCH HARQ-ACK of one or more SCells is reported on the PCell according to the timing reference defined in Table (2).

For eCA with different UL-DL configurations, each cell may have different M values. $M_c$ may be defined as the M for the cell c. In other words, $M_c$ indicates a number of subframes that require PDSCH HARQ-ACK feedback for a cell c in a given uplink subframe. It should be noted, for example, that $M_c$ may depend on the uplink subframe. More specifically, M for a cell (e.g., $M_c$) may be different in different uplink subframes. For the PCell, $M_c$ is the number of elements in the set K defined in Table (3) associated with subframe n and the set K according to the PCell configuration. The set K may include at least one PDSCH HARQ-ACK association k. For an SCell, since the PDSCH HARQ-ACK timing may be the same or different from the SCell timing, the PDSCH HARQ-ACK timing and the SCell timing may be determined differently.

In one approach, the $M_c$ of a SCell may be defined as $M_{Ref}$ (e.g., the M of the reference configuration for which the PDSCH HARQ-ACK timing is followed). In other words, $M_{Ref}$ indicates a number of subframes with a PDSCH HARQ-ACK association for a reference configuration. For case A in this approach (e.g., if the set of DL subframes indicated by the SCell configuration is a subset of the DL subframes indicated by the PCell configuration), the SCell may follow the PCell configuration. Thus, $M_{Ref}=M_{PCell}$ where $M_{PCell}$ is the M of the PCell (e.g., the number of elements in the set K defined in Table (3) associated with subframe n and the set K according to the PCell configuration). In other words, $M_{PCell}$ indicates a number of subframes with a PDSCH HARQ-ACK association for the PCell configuration.

For case B in this approach (e.g., if the set of DL subframes indicated by the PCell configuration is a subset of the DL subframes indicated by the SCell configuration), the SCell may follow the SCell configuration. Thus, $M_{Ref}=M_{SCell}$ where $M_{SCell}$ is the M of the SCell (e.g., the number of elements in the set K defined in Table (3) associated with subframe n and the set K according to the SCell configuration). In other words, $M_{SCell}$ indicates a number of subframes with a PDSCH HARQ-ACK association for the SCell configuration.

For case C in this approach (e.g., if the set of DL subframes indicated by the PCell configuration is a subset of the DL subframes indicated by the SCell configuration), the SCell may follow the reference configuration as shown in Table (2). Thus, $M_{Ref}=M_{RefConf}$ where $M_{RefConf}$ (e.g., a predetermined parameter) is the M of the reference configuration (e.g., the number of elements in the set K defined in Table (3) associated with subframe n and the set K according to the reference UL-DL configuration in Table (2)). In other words, $M_{RefConf}$ indicates a number of subframes with a PDSCH HARQ-ACK association for the reference configuration.

In case A, there are conflicting subframes, where the PCell is configured with a DL subframe (or special subframe, for example) and SCell is configured with an UL subframe. Thus, the corresponding HARQ-ACK bits will never be generated on the SCell or they may be reported as a discontinuous transmission (DTX). For case A, m may be defined as the number of conflicting subframes, where the PCell configuration includes a DL subframe (or special subframe, for example) and one or more SCell configurations include an UL subframe in the set K defined in Table (3) associated with subframe n and the set K according to the PCell configuration.

Similarly, in case C, there are conflicting subframes, where the reference configuration includes a DL subframe (or special subframe, for example) and the SCell configuration includes an UL subframe. Thus, the corresponding HARQ-ACK bits may never be generated on the SCell or they may be reported as a DTX. For case C, m may be defined as the number of conflicting subframes (where the PCell configuration includes a DL subframe (or special subframe, for example) and the SCell configured includes an UL subframe) in the set K defined in Table (3) associated with subframe n and the set K according to the reference configuration in Table (2).

In another approach, the $M_c$ of an SCell may be defined as $M_{Eff}$, where $M_{Eff}$ is the effective M of the reference configuration for which the PDSCH HARQ-ACK timing is followed excluding the conflicting subframes, where the PCell configuration or reference configuration includes a DL subframe (or special subframe, for example) and the SCell configuration includes an UL subframe (e.g., $M_{Eff}=M_{Ref}-m$). In other words, $M_{Ref}$ is a number of subframes with PDSCH HARQ-ACK associations for the reference configuration and m is a number of the conflicting subframes that are downlink subframes and special subframes in the reference configuration and uplink subframes in the SCell configuration.

For cross-carrier scheduling, the PDSCH transmission of one cell may be scheduled from another cell with the exception that the PCell may only be scheduled by itself. Several approaches may be considered to decide the $M_c$ of an SCell in the cross-carrier scheduling context.

In the cross-carrier scheduling context, the same approaches for self scheduling as described above may be applied. This leads to a common design for the PDSCH HARQ-ACK reporting. This may be so, for example, for approaches that support cross-carrier scheduling of a conflicting subframe (e.g., by way of cross-transmission time interval (TTI) or cross-subframe scheduling).

In known approaches, however, cross-carrier PDSCH scheduling only allows the scheduling from another cell in the same TTI. Thus, it may be simpler for an SCell to follow the HARQ-ACK timing of the scheduling cell (e.g., the PCell). Therefore, a cross-carrier scheduled cell may follow the timing of the scheduling cell.

Thus, in another approach, the $M_c$ of the SCell may follow the scheduling cell (e.g., PCell). In one implementation, the $M_c$ of the SCell may be $M_{SchedulingCell}$, where $M_{SchedulingCell}$ is the M of the scheduling cell (where M is the number of elements in the set K defined in Table (3) associated with subframe n and the set K according to the scheduling cell UL-DL configuration). In other words, $M_{SchedulingCell}$ is a number of subframes with a PDSCH HARQ-ACK association for a scheduling cell configuration. In a case where the scheduling cell is not the PCell, the PDSCH reporting reference configuration of the scheduling cell may be used instead of the scheduling cell configuration. In another implementation, the $M_c$ of the SCell may be $M_{Eff\_SchedulingCell}$, where $M_{Eff\_SchedulingCell}$ is the $M_{Eff}$ of the scheduling cell (where $M_{Eff}$ is the effective M of the scheduling cell configuration for which the PDSCH HARQ-ACK timing is followed, excluding the conflicting subframes, for example). In other words, $M_{Eff\_SchedulingCell}$ is a number of subframes with a PDSCH HARQ-ACK association for a scheduling cell configuration excluding conflicting subframes. In this case, a conflicting subframe may be a subframe where the scheduling cell configuration includes a DL subframe (or special subframe, for example) and the SCell configuration includes an UL subframe. In a case where the scheduling cell is not the PCell, the PDSCH reporting reference configuration of the scheduling cell may be used instead of the scheduling cell configuration.

Modifications and extensions to support TDD CA with different configurations are described in greater detail as follows. Utilizing TDD CA with different UL-DL configurations may cause several issues due to different parameters on different cells. For example, if PUCCH Format 3 is configured, HARQ-ACK multiplexing may need to take into account whether the conflicting subframes (e.g., with PCell DL and SCell UL) are reported or counted in the HARQ-ACK bits. Furthermore, if the PCell configuration is configuration 0, subframes 3 and 8 have no HARQ-ACK to be reported on the PCell. Thus, they may include HARQ-ACK bits only corresponding to the SCell. Special handling may be needed. The systems and methods disclosed herein provide solutions for these issues as follows.

More detail regarding PUCCH Format 3 HARQ-ACK multiplexing is given as follows. If PUCCH Format 3 is configured for a UE, the HARQ-ACK bits of cells may be multiplexed with carrier aggregation. The number of HARQ-ACK bits of each cell may be determined based on M.

For TDD, when PUCCH Format 3 is configured for transmission of HARQ-ACK, the HARQ-ACK feedback bits $o_{c,0}^{ACK} o_{c,1}^{ACK}, \ldots, o_{c,O_c^{ACK}-1}^{ACK}$ for the c-th serving cell configured by Radio Resource Control (RRC) (signaling, for example) may be constructed as follows. $c \geq 0$ and $O_c^{ACK}=B_c^{DL}$ if a transmission mode configured in the c-th serving cell supports one transport block or spatial HARQ-ACK bundling is applied and $O_c^{ACK}=2B_c^{DL}$ otherwise. $B_c^{DL}$ is the number of downlink subframes for which the UE needs to feedback HARQ-ACK bits for the c-th serving cell.

In Rel-10, for the case that the UE is transmitting on PUCCH, $B_c^{DL}=M$, where M is the number of elements in the set K defined in Table (3) associated with subframe n and the set K does not include a special subframe of configurations 0 and 5 with a normal downlink cyclic prefix (CP) or of configurations 0 and 4 with extended downlink CP. Otherwise, $B_c^{DL}=M-1$. The same rule may be applied in accordance with the systems and methods herein. With the $M_c$ of each cell, $B_c^{DL}=M_c-1$ if the set K of the reference configuration includes a special subframe of configurations 0 and 5 with normal downlink CP or of configurations 0 and 4 with extended downlink CP.

In LTE Rel-10, M is the same for all cells. With eCA with different UL-DL configurations, however, $M_c$ of each cell may be different. Approaches for determining $M_c$ are provided above. Accordingly, the approach to determine $M_c$ may impact PUCCH Format 3 HARQ-ACK multiplexing. For the case that the UE is transmitting on the PUCCH, $B_c^{DL}=M_c$, where $M_c$ is the number of elements in the set K defined in Table (3) associated with subframe n. In this case, the set K does not include the special subframe of configurations 0 and 5 with normal downlink CP or of configurations 0 and 4 with extended downlink CP. Otherwise, $B_c^{DL}=M_c-1$.

In one approach, the $M_c$ may be a selected $M_{Ref}$. Thus, $M_c$ of an SCell is $M_{PCell}$ in case A, $M_{SCell}$ in case B and $M_{RefConf}$ in case C according to Table (2). This may provide the benefit of a simpler solution to reuse an existing table and determination of M according to the reference UL-DL configuration. On the other hand, there may be conflicting subframes between the PCell configuration or reference configuration with a DL subframe and an SCell configuration with an UL subframe. The HARQ-ACK bits may still need to be reported as DTX even if the PDSCH cannot be scheduled on the SCell. Thus, this approach may have higher HARQ-ACK payload on PUCCH Format 3, particularly when multiple cells are aggregated.

In another approach, $M_c$ may be selected as $M_{Eff}$ (e.g., the effective M of the reference configuration for which the PDSCH HARQ-ACK timing is followed), excluding the conflicting subframes (where the PCell or reference configuration includes a DL subframe (or special subframe) and the SCell configuration includes an UL subframe). This approach does not report HARQ-ACK bits in conflicting subframes (where the PCell configuration or reference configuration has a DL subframe and the SCell configuration includes an UL subframe). Thus, it reduces the HARQ-ACK payload on PUCCH Format 3, particularly when multiple cells are aggregated.

With cross-carrier scheduling and no cross-TTI scheduling or multiple subframe scheduling, the $M_c$ of the scheduled cell may be set as the $M_c$ of the scheduling cell. Similarly, the $M_{Ref}$ or the $M_{Eff}$ of the scheduling cell may be used as the $M_c$ of the scheduled cell. In a case where the scheduling cell is not the PCell, the PDSCH reporting reference configuration of the scheduling cell may be used instead of the scheduling cell configuration.

More detail is given hereafter regarding PDSCH HARQ-ACK reporting in subframes 3 and 8 if the PCell is configured with UL-DL configuration 0 in accordance with the systems and methods disclosed herein. In UL-DL configuration 0, there is no DL subframe associated with subframes 3 and 8. If the PCell is configured with UL-DL configuration 0, no PUCCH resource is allocated for the PCell. However, with eCA with different configurations, the HARQ-ACK of one or more SCells may be reported on the PCell. Table (4) below illustrates possible combinations with SCell reporting when the PCell is configured with UL-DL configuration 0. In other words, Table (4) illustrates cases with no HARQ-ACK on the PCell, when the PCell configuration is configuration 0.

TABLE (4)

| PCell Configuration | SCell Configuration | Number of subframes associated to subframe 3 in SCell | Number of DL subframes associated to subframe 8 in SCell |
|---|---|---|---|
| 0 | 1 | 1 | 1 |
| 0 | 2 | N/A | N/A |
| 0 | 3 | 2 | N/A |
| 0 | 4 | 4 | N/A |
| 0 | 5 | N/A | N/A |
| 0 | 6 | 1 | 1 |

In LTE Rel-10 CA, all cells have the same UL-DL configuration. A UE may use either PUCCH Format 3 or PUCCH Format 1a/1b with channel selection. If UL-DL configuration 0 is configured on the PCell, the PDSCH HARQ-ACK timing of an SCell may follow the SCell configuration. If PUCCH Format 3 is configured for the UE, there are several approaches for HARQ-ACK reporting.

One approach involves always using PUCCH Format 3 and HARQ-ACK multiplexing of all cells. In this approach, the number of HARQ-ACKs on the PCell should be 0 in UL subframes 3 and 8 with UL-DL configuration 6 as the PCell configuration. Thus, only HARQ-ACK bits of one or more SCells are multiplexed and reported using Format 3. This can be viewed as an extension of Rel-10. However, Format 3 may be used even for reporting one or two bits from an SCell only. This may unnecessarily waste PUCCH resources.

In LTE Rel-10, a fallback mode is defined for the PCell under CA. In case a PDSCH transmission only on the PCell is received, Format 1a/1b and Format 1b with channel selection may be applied instead of Format 3. In another approach, this principle may be extended to the HARQ-ACK reporting in subframe 3 and 8 when UL-DL configuration 0 is configured on the PCell and there are only two configured serving cells. For more than two configured serving cells, PUCCH Format 3 may be applied.

Therefore, in subframes 3 and 8, when UL-DL configuration 0 is configured on the PCell and only two cells are configured, the UE may apply PUCCH Format 1a/1b and PUCCH resource $n_{PUCCH}^{(1,\tilde{p})}$ for transmission of HARQ-ACK in subframe n for $\tilde{p}$ mapped to antenna port p in the following cases. In one case, the UE may apply PUCCH Format 1a/1b and PUCCH resource $n_{PUCCH}^{(1,\tilde{p})}$ for a single PDSCH transmission only on the SCell indicated by the detection of a corresponding PDCCH in subframe $n-k_m$ (where $k_m \in K$ according to the SCell UL-DL configuration) and for UL-DL configurations 1-6, where the Downlink Assignment Index (DAI) value in the PDCCH is equal to '1' (defined in Table 7.3-X of 3GPP TS 36.213, for example). In other words, when UL-DL configuration 0 is configured on the PCell and only two cells are configured, in subframes 3 and 8, if $M_{SCell}=1$, PUCCH Format 1a/1b may be used instead of Format 3.

In subframes 3 and 8, when UL-DL configuration 0 is configured on the PCell and only two cells are configured, for $M_{SCell}>1$, a single cell channel selection approach may be applied and PUCCH Format 1b may be applied with channel selection (according to the set of Tables 10.1.3-2, 3 and 4 or the set of Tables 10.1.3-5, 6 and 7 of 3GPP TS 36.213 based on higher layer signaling). For the selected table set indicated by higher layer signaling, the UE may transmit b(0),b(1) on PUCCH resource $n_{PUCCH}^{(1)}$ in subframe n using PUCCH Format 1b. The value of b(0),b(1) and the PUCCH resource $n_{PUCCH}^{(1)}$ are generated by channel selection according to the selected set of Tables for $M_{SCell}=2$, 3, and 4, respectively.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more eNBs 160 and one or more UEs 102 in which systems and methods for sending and receiving feedback information may be implemented. The one or more UEs 102 communicate with one or more eNBs 160 using one or more antennas 122*a-n*. For example, a UE 102 transmits electromagnetic signals to the eNB 160 and receives electromagnetic signals from the eNB 160 using the one or more antennas 122*a-n*. The eNB 160 communicates with the UE 102 using one or more antennas 180*a-n*.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of UL-DL configurations 128, a UE UL-DL configuration determination module 130, a HARQ-ACK generation module 132, a UE reporting subframe determination module 134, a UE feedback parameter determination module 126 and a format application module 184.

The UL-DL configurations 128 may specify a set of UL-DL configurations that may be used for communication between the UE 102 and the eNB 160. Examples of UL-DL configurations include the UL-DL configurations 0-6 illustrated in Table (1) above. The UL-DL configurations 128 may specify UL, DL and special subframes for communication with the eNB(s) 160. For example, the UL-DL configurations 128 may indicate DL subframes for the UE 102 to receive information from the eNB 160 and may indicate UL subframes for the UE 102 to transmit information to the eNB 160. For proper communication on a cell, the UE 102 and the eNB 160 may apply the same UL-DL configuration 128 on the same cell. However, different UL-DL configurations 128 may be applied on different cells (e.g., PCell and SCell(s)).

The UL-DL configurations 128 may also indicate PDSCH HARQ-ACK associations. A PDSCH HARQ-ACK association may specify a particular (PDSCH HARQ-ACK) timing for sending HARQ-ACK information corresponding to a PDSCH. For example, the HARQ-ACK generation module 132 may generate HARQ-ACK information corresponding to a PDSCH based on whether a signal (e.g., data) in the PDSCH was correctly received or not. A PDSCH HARQ-ACK association may specify a reporting subframe in which the UE 102 reports (e.g., transmits) the HARQ-ACK information corresponding to the PDSCH. The reporting subframe may be determined based on the subframe that includes the PDSCH.

The UE UL-DL configuration determination module 130 may determine which of the UL-DL configuration(s) 128 for the UE 102 to apply for one or more cells. For example, the UE 102 may receive one or more RRC configuration (e.g., SIB-1 broadcasted information or dedicated signaling) indicating UL-DL configuration(s) 128 for a PCell and for one or more SCells. For instance, a PCell and an SCell may be utilized in carrier aggregation. The UE UL-DL configuration determination module 130 may determine which UL-DL configuration 128 is assigned to the PCell and which UL-DL configuration 128 is assigned to the SCell. The UL-DL configurations 128 for the PCell and SCell(s) may be the same or different.

The UE reporting subframe determination module 134 may determine a reporting subframe for sending HARQ-ACK information. For example, the UE reporting subframe determination module 134 may determine a HARQ-ACK reporting subframe in which the UE 102 sends SCell HARQ-ACK information (e.g., PDSCH HARQ-ACK information corresponding to an SCell). For example, the UE reporting subframe determination module 134 may determine a reporting subframe for sending SCell HARQ-ACK information on the PCell according to the timing reference described above in Table (3). For instance, Table (3) above (e.g., the PDSCH HARQ-ACK association table) gives the location of a corresponding PDSCH by the index set $K:\{k_0, k_1, \ldots, k_{M-1}\}$ for a subframe (e.g., UL subframe) number n, where the HARQ-ACK of a PDSCH in subframe $n-k$ (e.g., $n-k_1$) is reported in UL subframe n. The UE 102 may send the SCell HARQ-ACK information in the determined HARQ-ACK reporting subframe.

The UE feedback parameter determination module 126 may determine one or more feedback parameters corresponding to one or more cells (e.g., PCell, SCell(s)). For example, the UE feedback parameter determination module 126 may determine a feedback parameter $M_c$ for one or more cells c. This determination may be accomplished as described in connection with one or more of FIG. 2, FIG. 3 and FIG. 11, for example. In some implementations, the determination may be based on one or more of a PCell configuration, an SCell configuration, a reference configuration, a number of conflicting subframes and a feedback parameter determination scheme.

The format application module 184 may apply a particular format to the HARQ-ACK information in certain cases. For example, the format application module 184 may apply one or more of Format 3, Format 1a/1b and Format 1a/1b with channel selection. This may be accomplished as described in connection with FIG. 11, for example.

The UE operations module 124 may provide information 148 to the one or more receivers 120. For example, the UE operations module 124 may inform the receiver(s) 120 when or when not to receive transmissions based on the UL-DL configurations 128.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. In some configurations, this may be based on a UL-DL configuration 128. For instance, the one or more transmitters 158 may transmit during an UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of UL-DL configurations 194, an eNB reporting subframe determination module 198, an eNB UL-DL configuration determination module 196, an eNB feedback parameter determination module 151 and an interpreter 107. In some implementations, the eNB operations module 182 may also include a scheme signaling module 153.

The UL-DL configurations 194 may specify a set of UL-DL configurations that may be used for communication between the eNB 160 and the UE(s) 102. Examples of UL-DL configurations 194 include the UL-DL configurations 0-6 illustrated in Table (1) above. The UL-DL configurations 194 may specify UL and DL subframes for communication with the UE(s) 102. For example, the UL-DL configurations 194 may indicate DL subframes for the eNB 160 to send information to the UE(s) 102 and may indicate UL subframes for the eNB 160 to receive information from the UE(s) 102. For proper communication on a cell, the UE 102 and the eNB 160 may apply the same UL-DL configuration 194 on the same cell. However, different UL-DL configurations 194 may be applied on different cells (e.g., PCell and SCell(s)).

The UL-DL configurations 194 may also indicate PDSCH HARQ-ACK associations. A PDSCH HARQ-ACK association may specify a particular (PDSCH HARQ-ACK) timing for receiving HARQ-ACK information corresponding to a PDSCH. A PDSCH HARQ-ACK association may specify a reporting subframe in which the UE 102 reports (e.g., transmits) the HARQ-ACK information corresponding to the PDSCH to the eNB 160. The reporting subframe may be determined based on the subframe that includes the PDSCH sent by the eNB 160.

The eNB UL-DL configuration determination module 196 may determine which of the UL-DL configuration(s) 194 for the UE 102 to apply for one or more cells. For example, the eNB 160 may send one or more RRC configuration (e.g., SIB-1 broadcasted information or dedicated signaling) indicating UL-DL configuration(s) 194 for a PCell and for one or more SCells. For instance, a PCell and an SCell may be utilized in carrier aggregation. The eNB UL-DL configuration determination module 196 may assign UL-DL configuration(s) 194 to the PCell and to the SCell. The eNB 160 may signal one or more of these assignments to a UE 102. The UL-DL configurations 194 for the PCell and SCell(s) may be the same or different.

The eNB reporting subframe determination module 198 may determine a reporting subframe for receiving HARQ-ACK information. For example, the eNB reporting subframe determination module 198 may determine a HARQ-ACK reporting subframe in which the eNB 160 receives SCell PDSCH HARQ-ACK information (e.g., PDSCH HARQ-ACK information corresponding to an SCell) from a UE 102. For example, the eNB reporting subframe determination module 198 may determine a reporting subframe for receiving SCell HARQ-ACK information on the PCell according to the timing reference described above in Table (3). For instance, Table (3) above (e.g., the PDSCH HARQ-ACK association table) gives the location of a corresponding PDSCH by the index set K:$\{k_0, k_1, \ldots, k_{M-1}\}$, for a subframe (e.g., UL subframe) number n, where the HARQ-ACK of a PDSCH in subframe n−k (e.g., n−$k_1$) is reported in UL subframe n. The eNB 160 may receive the SCell HARQ-ACK information in the determined HARQ-ACK reporting subframe.

The eNB feedback parameter determination module 151 may determine one or more feedback parameters corresponding to one or more cells (e.g., PCell, SCell(s)). For example, the eNB feedback parameter determination module 151 may determine a feedback parameter $M_c$ for one or more cells c. This determination may be accomplished as described in connection with one or more of FIG. 9 and FIG. 10, for example. In some implementations, the determination may be based on one or more of a PCell configuration, an SCell configuration, a reference configuration, a number of conflicting subframes and a feedback parameter determination scheme.

The optional scheme signaling module 153 may generate a feedback parameter determination scheme indicator. In some implementations, one of multiple feedback parameter determination schemes may be utilized. In these implementations, the eNB 160 may signal which scheme is utilized. For example, the eNB 160 may send a feedback parameter determination scheme indicator that indicates whether the feedback parameter (e.g., $M_c$) is determined based on a reference parameter (e.g., $M_{Ref}$) or based on the reference parameter and a number of conflicting subframes (e.g., $M_{Eff}=M_{Ref}-m$). In other implementations, only one feedback parameter determination scheme may be utilized by the eNB 160 and UE 102. In these implementations, the eNB 160 may not signal a scheme.

The interpreter 107 may interpret formats of the HARQ-ACK information in certain cases. For example, the interpreter 107 may interpret one or more of Format 3, Format 1a/1b and Format 1a/1b with channel selection. This may be accomplished as described in connection with FIG. 10, for example.

The eNB operations module 182 may provide information 190 to the one or more receivers 178. For example, the eNB operations module 182 may inform the receiver(s) 178 when or when not to receive transmissions based on a UL-DL configuration 194 for a given cell.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101. The other information 101 may include one or more of RRC configuration (e.g., SIB-1 broadcasted information or dedicated signaling) (e.g., PCell configuration indicator, SCell configuration indicator) and a feedback parameter determination scheme indicator, for example.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on an UL-DL configuration 194. The one or more transmitters 117 may upconvert and transmit the modulated signal(s) 115 to one or more UEs 102.

It should be noted that a DL subframe may be transmitted from the eNB 160 to one or more UEs 102 and that an UL subframe may be transmitted from one or more UEs 102 to the eNB 160. Furthermore, both the eNB 160 and the one or more UEs 102 may transmit data in a standard special subframe.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
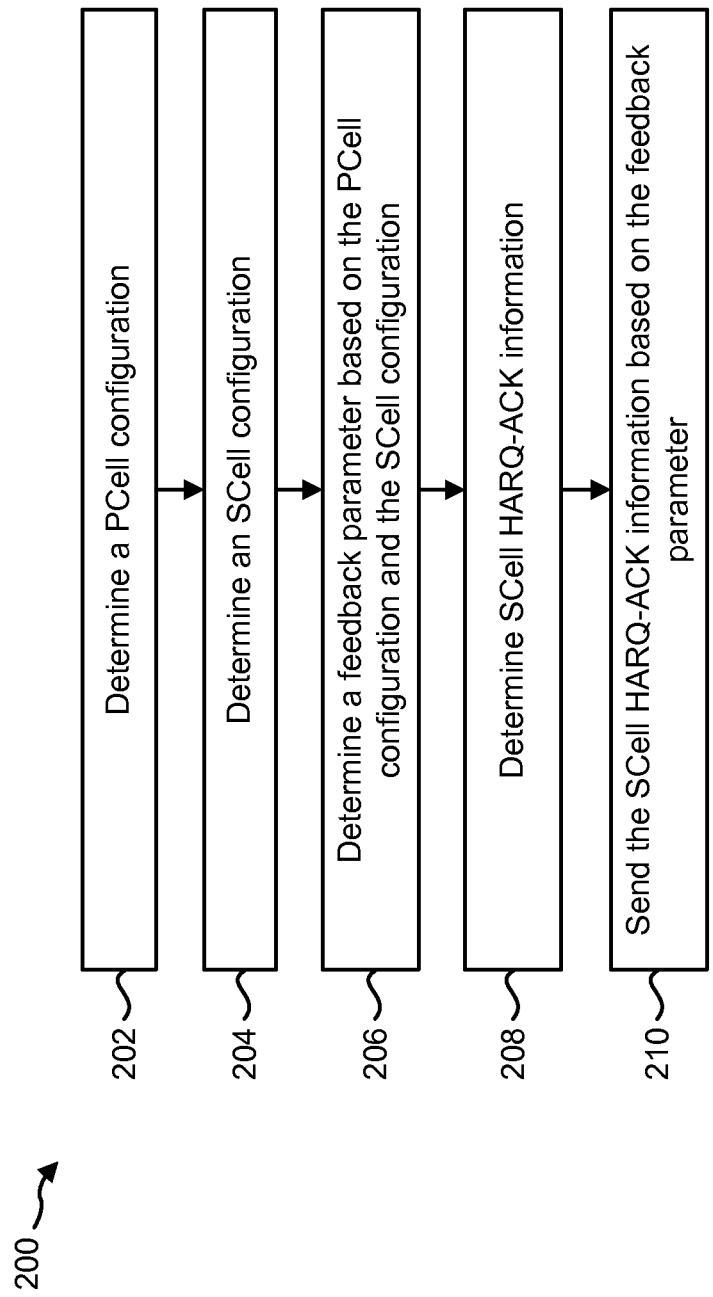
FIG. 2 is a flow diagram illustrating one configuration of a method for sending feedback information.

FIG. 2 is a flow diagram illustrating one configuration of a method 200 for sending feedback information. A UE 102 may determine 202 a PCell configuration. For example, the UE 102 may receive an RRC configuration (e.g., SIB-1 broadcasted information or dedicated signaling) and determine an UL-DL configuration corresponding to (e.g., assigned to, to be applied to) a PCell based on the RRC configuration.

The UE 102 may determine 204 an SCell configuration. For example, the UE 102 may receive an RRC configuration (e.g., SIB-1 broadcasted information or dedicated signaling) and determine an UL-DL configuration corresponding to (e.g., assigned to, to be applied to) an SCell based on the RRC configuration. The remaining method 200 steps may be performed when the PCell configuration and the SCell configuration are different.

The UE 102 may determine 206 a feedback parameter based on the PCell configuration and the SCell configuration. For example, the UE 102 may determine 206 the feedback parameter based on whether a set of DL subframes for the SCell configuration is a subset of a set of DL subframes for the PCell configuration (case A), whether a set of DL subframes for the PCell configuration is a subset of a set of DL subframes for the SCell configuration (case B) or neither (case C).

In some implementations, the UE 102 may determine 206 a feedback parameter in accordance with one or more of the approaches described above. The feedback parameter may indicate a number of subframes that require PDSCH HARQ-ACK feedback for the SCell for a particular UL-DL configuration in a given uplink subframe. For instance, the UE 102 may determine the feedback parameter of an SCell as a reference parameter. The reference parameter may indicate a number of subframes with a PDSCH HARQ-ACK association for a reference configuration.

For example, the reference parameter may be set to a PCell parameter if a set of DL subframes for the SCell configuration is a subset of a set of DL subframes for the PCell configuration (e.g., case A). Alternatively, the reference parameter may be set to an SCell parameter if a set of DL subframes for the PCell configuration is a subset of a set of DL subframes for the SCell configuration (e.g., case B). Alternatively, the reference parameter may be set to a predetermined parameter if a set of DL subframes for the SCell configuration is neither a subset nor a superset of a set of DL subframes for the PCell configuration (e.g., case C).

In some implementations, a similar approach may be applied for cross-carrier scheduling. For example, the UE 102 may determine 206 a feedback parameter based on a similar approach when the SCell is cross-carrier scheduled. Alternatively, the UE 102 may determine 206 the feedback parameter as a scheduling cell parameter when the SCell is cross-carrier scheduled.

In some implementations, the UE 102 may determine 206 the feedback parameter based on a number of conflicting subframes. For example, the UE 102 may determine a reference parameter as described above and may set the feedback parameter equal to the reference parameter minus a number of conflicting subframes. In other words, this may be a number of downlink subframes and special subframes with PDSCH HARQ-ACK associations for an SCell that is following a reference configuration, excluding the conflicting subframes. Conflicting subframes may be subframes that are DL subframes and special subframes in the reference configuration and are UL subframes in the SCell configuration.

The UE 102 may determine 208 SCell HARQ-ACK information. For example, the UE 102 may determine 208 whether one or more PDSCH signals (e.g., voice, data) were correctly received on the SCell. For instance, the UE 102 may generate an Acknowledgement (ACK) bit for each packet that is correctly received on the PDSCH on the SCell. However, the UE 102 may generate a Negative Acknowledgement (NACK) bit for each packet that is not correctly received on the PDSCH on the SCell. It should be noted that the UE 102 may also generate PCell HARQ-ACK information. For instance, HARQ-ACK information corresponding to both the PCell and SCell may be generated in some cases. As described in greater detail below, for example, a feedback parameter (e.g., M) of the SCell may be determined for HARQ-ACK multiplexing with PCell HARQ-ACK bits.

The UE 102 may send 210 the SCell HARQ-ACK information based on the feedback parameter. For example, the feedback parameter may specify the number of subframes to feedback HARQ-ACK for the SCell. For instance, the feedback parameter may be utilized to determine the number of HARQ-ACK bits to be reported for the SCell. The HARQ-ACK bits of the SCell may then be multiplexed with the HARQ-ACK bits of the PCell and reported in an uplink report.

Figure 3:
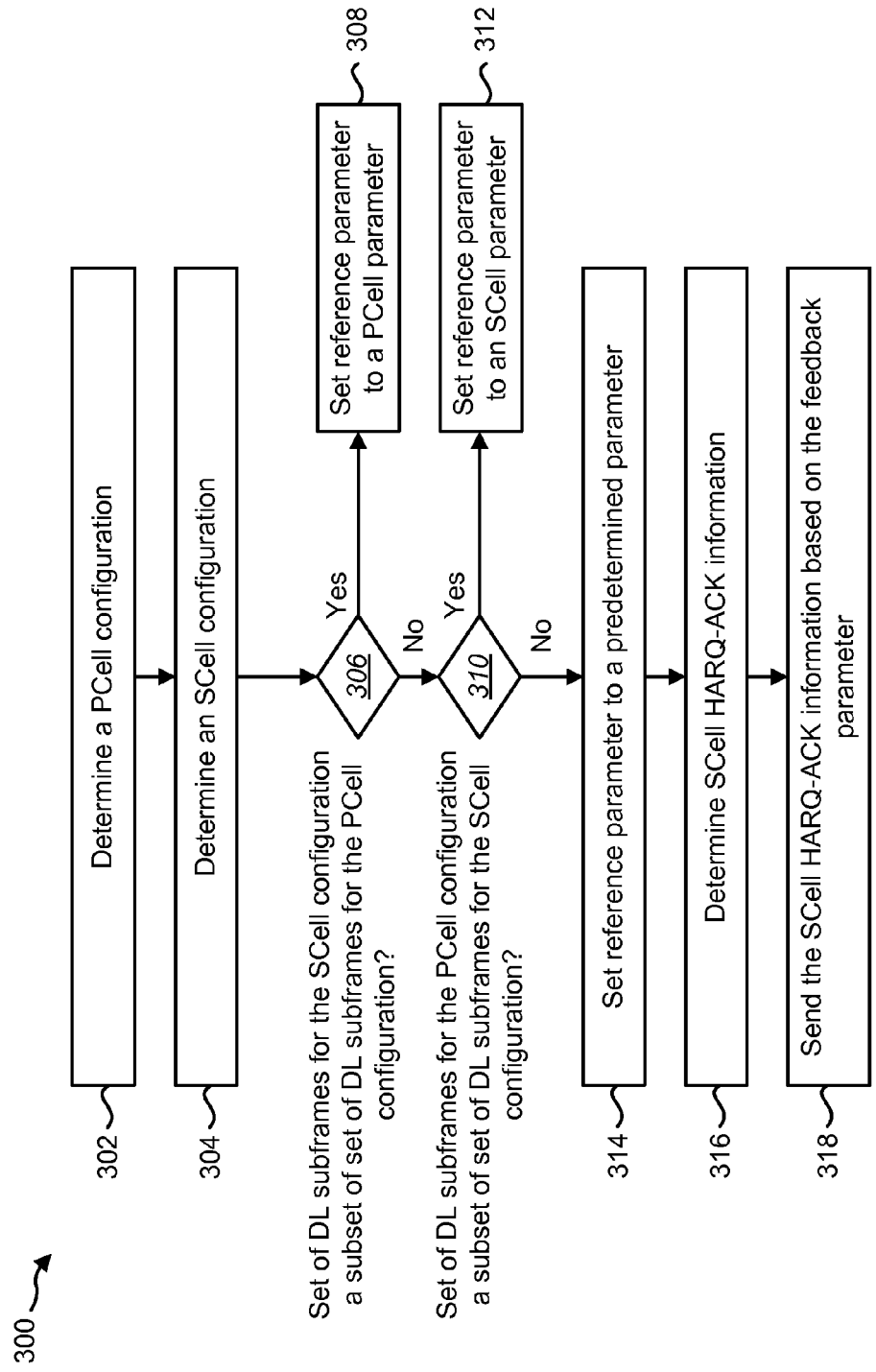
FIG. 3 is a flow diagram illustrating a more specific configuration of a method for sending feedback information.

FIG. 3 is a flow diagram illustrating a more specific configuration of a method 300 for sending feedback information. A UE 102 may determine 302 a PCell configuration. For example, the UE 102 may receive an RRC configuration (e.g., SIB-1 broadcasted information or dedicated signaling) and determine an UL-DL configuration corresponding to (e.g., assigned to, to be applied to) a PCell based on the RRC configuration.

The UE 102 may determine 304 an SCell configuration. For example, the UE 102 may receive an RRC configuration (e.g., SIB-1 broadcasted information or dedicated signaling) and determine an UL-DL configuration corresponding to (e.g., assigned to, to be applied to) an SCell based on the RRC configuration. The remaining method 300 steps may be performed when the PCell configuration and the SCell configuration are different.

In some approaches, the UE 102 may determine a feedback parameter based on a reference parameter as follows. In particular, the feedback parameter $M_c$ may be determined in accordance with one or more of the approaches described above. $M_c$ may indicate a number of subframes that require PDSCH HARQ-ACK feedback for cell c (e.g., the SCell) for an UL-DL configuration in a given uplink subframe. For instance, the UE 102 may determine the feedback parameter $M_c$ of an SCell as the reference parameter, $M_{Ref}$. $M_{Ref}$ may indicate a number of subframes with a PDSCH HARQ-ACK association for a reference configuration.

The UE 102 may determine 306 whether a set of DL subframes for the SCell configuration is a subset of a set of DL subframes for the PCell configuration. For example, the UE 102 may determine whether all of the DL subframes (or special subframes, for example) specified by the SCell configuration (as shown in Table (1)) are also DL subframes (or special subframes, for example) specified by the PCell configuration (as shown in Table (1)). For instance, the UE 102 may determine whether the SCell configuration and PCell configuration correspond to case A as shown in Table (2).

If the set of DL subframes for the SCell configuration is a subset of a set of DL subframes for the PCell configuration (case A), then the UE 102 may set 308 the reference parameter to a PCell parameter. For example, the reference parameter $M_{Ref}$ may be set 308 to the PCell parameter $M_{PCell}$ if a set of DL subframes for the SCell configuration is a subset of a set of DL subframes for the PCell configuration (case A).

If the set of DL subframes for the SCell configuration is not a subset of a set of DL subframes for the PCell configuration, the UE 102 may determine 310 whether the set of DL subframes for the PCell configuration is a subset of a set of DL subframes for the SCell configuration. If the set of DL subframes for the PCell configuration is a subset of a set of DL subframes for the SCell configuration (case B), then the UE 102 may set 312 the reference parameter to an SCell parameter. For example, the reference parameter $M_{Ref}$ may be set 312 to the SCell parameter $M_{SCell}$ if a set of DL subframes for the PCell configuration is a subset of a set of DL subframes for the SCell configuration (case B).

If the set of DL subframes for the PCell configuration is neither a subset of a set of DL subframes nor a superset of a set of DL subframes for the SCell configuration, the UE 102 may set 314 the reference parameter to a predetermined parameter. For example, the reference parameter $M_{Ref}$ may be set 314 to a predetermined parameter $M_{RefConf}$ if a set of DL subframes for the SCell configuration is neither a subset nor a superset of a set of DL subframes for the PCell configuration (case C). It should be noted that the predetermined parameter $M_{RefConf}$ may correspond to a reference configuration specified in Table (2) for case C.

In some implementations, the UE 102 may determine the feedback parameter based on a number of conflicting subframes m and the reference parameter $M_{Ref}$. For example, the UE 102 may determine the reference parameter $M_{Ref}$ as described above and may set the feedback parameter $M_c$ equal to $M_{Eff} = M_{Ref} - m$. In other words, $M_{Eff}$ may be a number of downlink subframes and special subframes with PDSCH HARQ-ACK associations for an SCell that is following a reference configuration, excluding the conflicting subframes. Conflicting subframes may be subframes that are DL subframes or special subframes in the reference configuration and are UL subframes in the SCell configuration.

In some implementations, a similar approach may be applied for cross-carrier scheduling. For example, the UE 102 may determine a feedback parameter based on a reference parameter $M_{Ref}$ (in addition to or alternatively from a number of conflicting subframes m) when the SCell is cross-carrier scheduled. Alternatively, the UE 102 may determine the feedback parameter as a scheduling cell parameter $M_{SchedulingCell}$ when the SCell is cross-carrier scheduled. $M_{SchedulingCell}$ may be a number of subframes with a PDSCH HARQ-ACK association for a scheduling cell (UL-DL) configuration. In a case where the scheduling cell is not the PCell, the ($M_c$ of the) PDSCH reporting reference configuration of the scheduling cell may be used instead of the ($M_c$ of the) scheduling cell configuration. In another implementation, the feedback parameter $M_c$ of the SCell may be $M_{Eff\_SchedulingCell}$, where $M_{Eff\_SchedulingCell}$ is the $M_{Eff}$ of the scheduling cell (where $M_{Eff}$ is the effective M of the scheduling cell (e.g., the PCell) configuration for which the PDSCH HARQ-ACK timing is followed, excluding the conflicting subframes, for example). In this case, a conflicting subframe may be a subframe that is a DL or special subframe in the scheduling cell configuration and is an UL subframe in the SCell configuration. In a case where the scheduling cell is not the PCell, the ($M_c$ of the) PDSCH reporting reference configuration of the scheduling cell may be used instead of the ($M_c$ of the) scheduling cell configuration.

The UE 102 may determine 316 SCell HARQ-ACK information. For example, the UE 102 may determine 316 whether one or more PDSCH signals (e.g., voice, data) were correctly received on the SCell. For instance, the UE 102 may generate an Acknowledgement (ACK) bit for each packet that is correctly received on the PDSCH on the SCell. However, the UE 102 may generate a Negative Acknowledgement (NACK) bit for each packet that is not correctly received on the PDSCH on the SCell.

The UE 102 may send 318 the SCell HARQ-ACK information based on the feedback parameter (e.g., the number of subframes to feedback HARQ-ACK for the SCell). For instance, the feedback parameter may be utilized to determine the number of HARQ-ACK bits to be reported for the SCell. The HARQ-ACK bits of the SCell may then be multiplexed with the HARQ-ACK bits of the PCell and reported in an uplink report.

Figure 4:
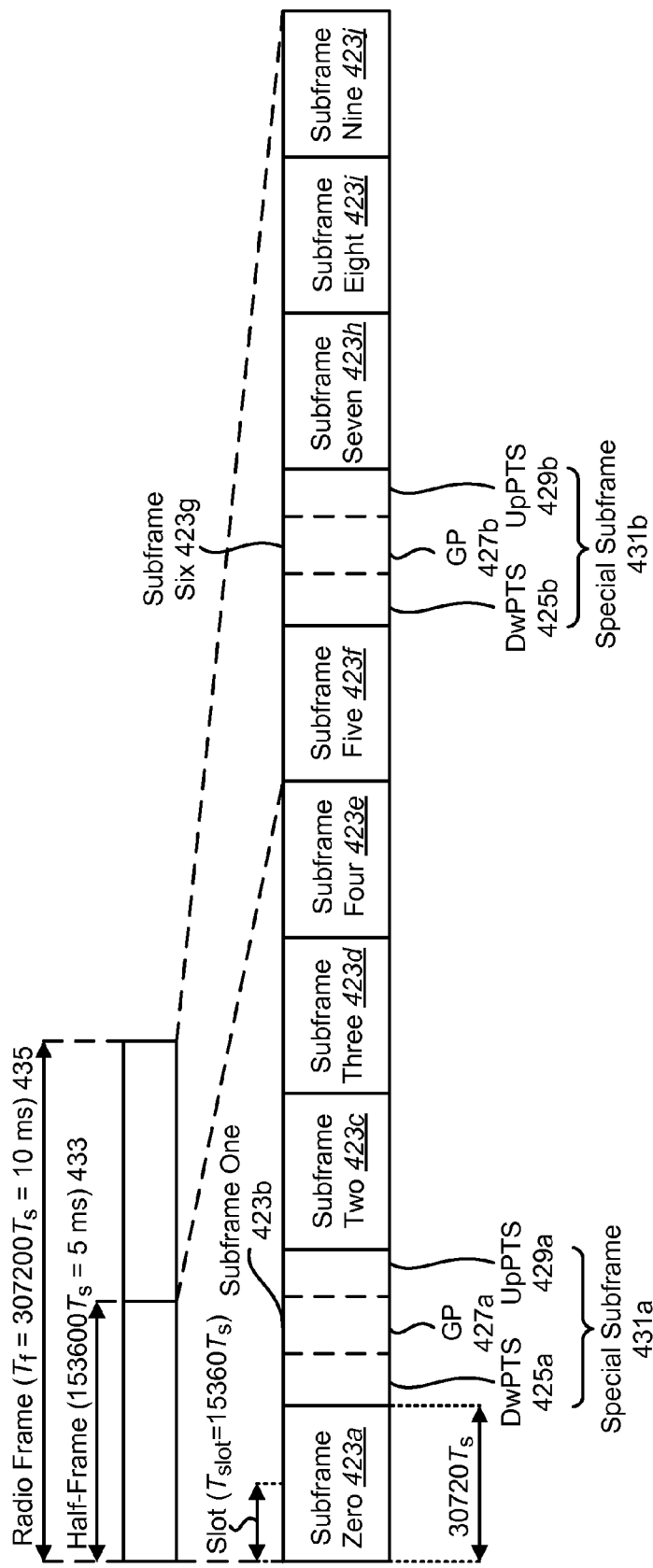
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure may be applicable in TDD approaches. Each radio frame 435 may have a length of $T_f = 307200 \cdot T_s = 10$ ms, where $T_f$ is a radio frame 435 duration and $T_s$ is a time unit equal to $$\frac{1}{(15000 \times 2048)}$$

seconds. The radio frame 435 may include two half-frames 433, each having a length of $153600 \cdot T_s = 5$ ms. Each half-frame 433 may include five subframes 423a-e, 423f-j each having a length of $30720 \cdot T_s = 1$ ms.

In Table (1) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (5) (from Table 4.2-1 of 3GPP TS 36.211) subject to the total length of DwPTS, GP and UpPTS being equal to $30720 \cdot T_s = 1$ ms. Table (5) illustrates several configurations of (standard) special subframes. Each subframe is defined as two slots, 2i and 2i+1 of length $T_{slot} = 15360 \cdot T_s = 0.5$ ms in each subframe. In Table (5), "cyclic prefix" is abbreviated as "CP" and "configuration" is abbreviated as "Config" for convenience.

TABLE (5)

| Special Subframe Config | Normal CP in downlink | | | Extended CP in downlink | | |
|---|---|---|---|---|---|---|
| | DwPTS | UpPTS Normal CP in uplink | UpPTS Extended CP in uplink | DwPTS | UpPTS Normal CP in uplink | UpPTS Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL-DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 423 that may be used include a downlink subframe, an uplink subframe and a special subframe 431. In the example illustrated in FIG. 4, which has a 5 ms periodicity, two standard special subframes 431a-b are included in the radio frame 435.

The first special subframe 431a includes a downlink pilot time slot (DwPTS) 425a, a guard period (GP) 427a and an uplink pilot time slot (UpPTS) 429a. In this example, the first standard special subframe 431a is included in subframe one 423b. The second standard special subframe 431b includes a downlink pilot time slot (DwPTS) 425b, a guard period (GP) 427b and an uplink pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table (5) above) subject to the total length of each set of DwPTS 425, GP 427 and UpPTS 429 being equal to 30720·$T_s$=1 ms.

Each subframe i 423a-j (where i denotes a subframe ranging from subframe zero 423a (e.g., 0) to subframe nine 423j (e.g., 9) in this example) is defined as two slots, 2i and 2i+1 of length $T_{slot}$=15360·$T_s$=0.5 ms in each subframe 423. For example, subframe zero (e.g., 0) 423a may include two slots, including a first slot.

UL-DL configurations with both 5 ms and 10 ms downlink-to-uplink switch-point periodicity may be used in accordance with the systems and methods disclosed herein. FIG. 4 illustrates one example of a radio frame 435 with 5 ms switch-point periodicity. In the case of 5 ms downlink-to-uplink switch-point periodicity, each half-frame 433 includes a standard special subframe 431a-b. In the case of 10 ms downlink-to-uplink switch-point periodicity, a special subframe may exist in the first half-frame 433 only.

Subframe zero (e.g., 0) 423a and subframe five (e.g., 5) 423f and DwPTS 425a-b may be reserved for downlink transmission. The UpPTS 429a-b and the subframe(s) immediately following the special subframe(s) 431a-b (e.g., subframe two 423c and subframe seven 423h) may be reserved for uplink transmission. It should be noted that, in some implementations, special subframes 431 may be considered DL subframes in order to determine a number of conflicting subframes.

Figure 5:
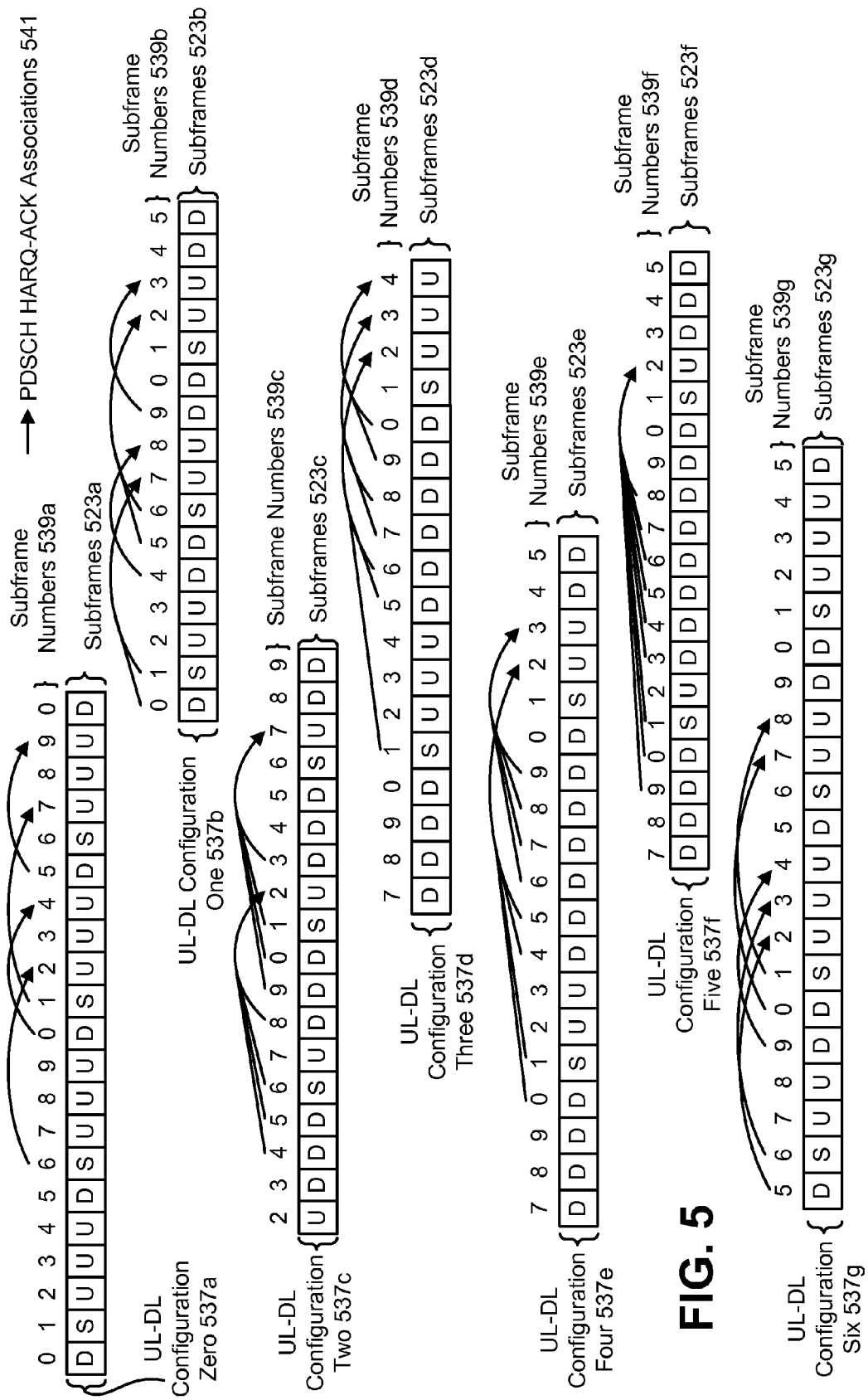
FIG. 5 is a diagram illustrating some uplink-downlink (UL-DL) configurations in accordance with the systems and methods described herein.

FIG. 5 is a diagram illustrating some UL-DL configurations 537a-g in accordance with the systems and methods described herein. In particular, FIG. 5 illustrates UL-DL configuration zero 537a (e.g., "UL-DL configuration 0") with subframes 523a and subframe numbers 539a, UL-DL configuration one 537b (e.g., "UL-DL configuration 1") with subframes 523b and subframe numbers 539b, UL-DL configuration two 537c (e.g., "UL-DL configuration 2") with subframes 523c and subframe numbers 539c and UL-DL configuration three 537d (e.g., "UL-DL configuration 3") with subframes 523d and subframe numbers 539d. FIG. 5 also illustrates UL-DL configuration four 537e (e.g., "UL-DL configuration 4") with subframes 523e and subframe numbers 539e, UL-DL configuration five 537f (e.g., "UL-DL configuration 5") with subframes 523f and subframe numbers 539f and UL-DL configuration six 537g (e.g., "UL-DL configuration 6") with subframes 523g and subframe numbers 539g.

FIG. 5 further illustrates PDSCH HARQ-ACK associations 541 (e.g., PDSCH HARQ-ACK feedback on PUCCH or PUSCH associations). The PDSCH HARQ-ACK associations 541 may indicate HARQ-ACK reporting subframes corresponding to subframes for PDSCH transmissions (e.g., subframes in which PDSCH transmissions may be sent and/or received). It should be noted that some of the radio frames illustrated in FIG. 5 have been truncated for convenience.

The systems and methods disclosed herein may be applied to one or more of the UL-DL configurations 537a-g illustrated in FIG. 5. For example, one or more PDSCH HARQ-ACK associations 541 corresponding to one of the UL-DL configurations 537a-g illustrated in FIG. 5 may be applied to communications between a UE 102 and eNB 160. For example, an UL-DL configuration 537 may be determined (e.g., assigned to, applied to) a PCell. In this case, PDSCH HARQ-ACK associations 541 may specify PDSCH HARQ-ACK timing (e.g., a HARQ-ACK reporting subframe) for HARQ-ACK feedback transmissions corresponding to the PCell. For SCell HARQ-ACK feedback transmissions, the PDSCH HARQ-ACK associations 541 corresponding to a reference UL-DL configuration in accordance with the feedback parameter may be utilized.

Figure 6:
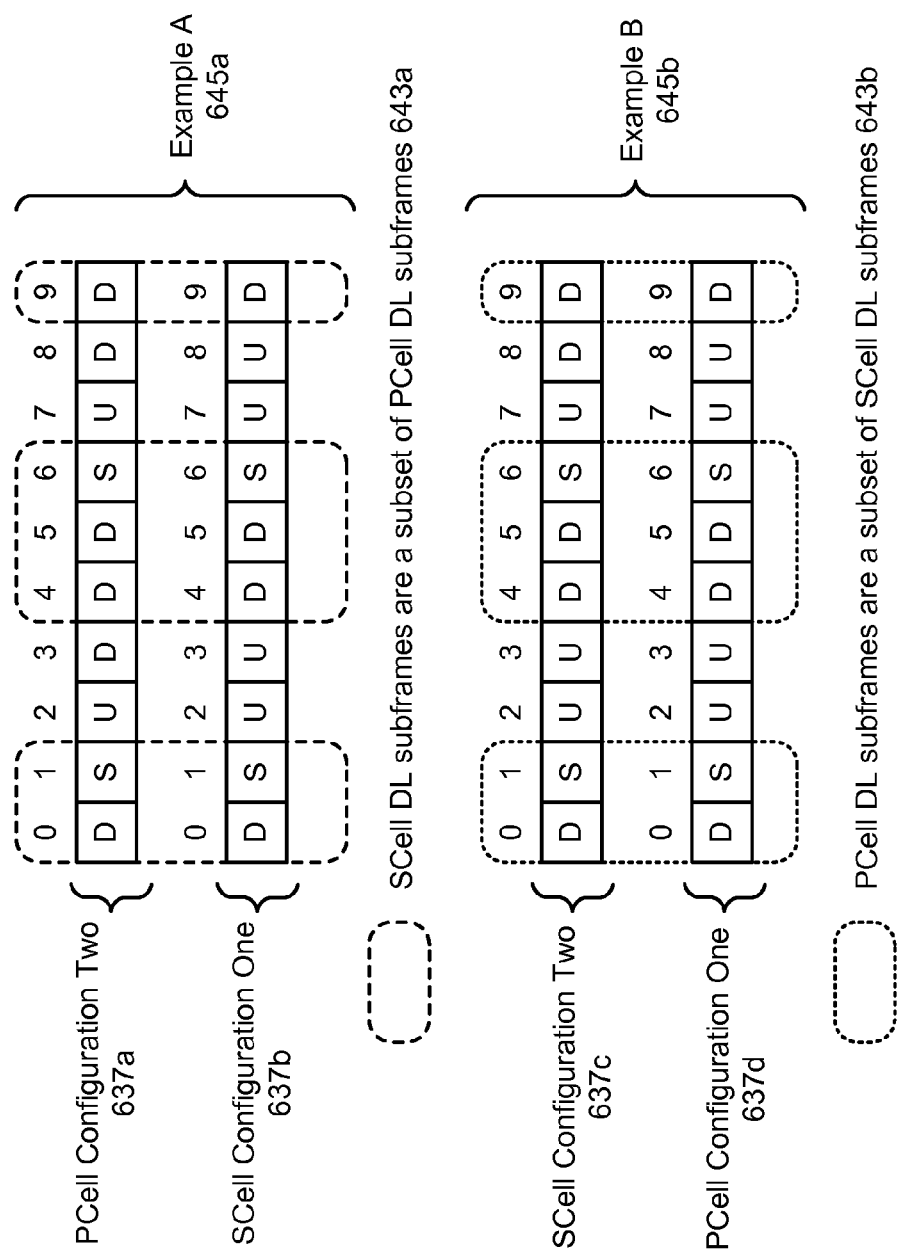
FIG. 6 is a diagram illustrating examples of primary cell (PCell) and secondary cell (SCell) configurations.

FIG. 6 is a diagram illustrating examples of PCell and SCell configurations. More specifically, example A 645a illustrates a set of DL subframes for an SCell configuration that are a subset of a set of DL subframes for a PCell configuration (e.g., case A). Example B 645b illustrates a set of DL subframes for a PCell configuration that are a subset of a set of DL subframes for an SCell configuration (e.g., case B).

In accordance with the systems and methods disclosed herein, the SCell PDSCH HARQ-ACK timing (e.g., reports) may follow the PCell configuration if the set of DL subframes indicated by the SCell configuration (as determined based on RCC dedicated signaling, for example) is a subset of the DL subframes indicated by the PCell configuration (as determined based on a SIB-1, for example) as dictated by the feedback parameter $M_c$. In this case, all DL subframes in the SCell configuration are also DL subframes in the PCell configuration. It should be noted that the PCell may have extra DL subframes allocated beyond those of the SCell. In FIG. 6, DL subframes are denoted with a "D," UL subframes are denoted with a "U," and special subframes (which may include both an UL component and a DL component, for example) are denoted as an "S" for convenience.

In particular, FIG. 6 illustrates example A 645a, where the set of DL subframes indicated by the SCell configuration is a subset of the DL subframes indicated by the PCell configuration. More specifically, example A 645a illustrates PCell configuration two (e.g., "2") 637a and SCell configuration one (e.g., "1") 637b. In example A 645a, SCell DL subframes 0, 1, 4, 5, 6 and 9 are a subset of PCell DL subframes 643a.

In accordance with the systems and methods disclosed herein, the SCell PDSCH HARQ-ACK timing (e.g., reports) may follow the SCell configuration if the set of DL subframes indicated by the PCell configuration (as determined based on RRC dedicated signaling, for example) is a subset of the DL subframes indicated by the SCell configuration (as determined based on a SIB-1, for example) as dictated by the feedback parameter $M_c$. In this case, all DL subframes in the PCell configuration are also DL subframes in the SCell configuration. It should be noted that the SCell may have extra DL subframes allocated beyond those of the PCell.

In particular, FIG. 6 illustrates example B 645b, where the set of DL subframes indicated by the PCell configuration is a subset of the DL subframes indicated by the SCell configuration. More specifically, example B 645b illustrates SCell configuration two (e.g., "2") 637*c* and PCell configuration one (e.g., "1") 637*d*. In example B 645*b*, PCell DL subframes 0, 1, 4, 5, 6 and 9 are a subset of SCell DL subframes 643*b*.

Figure 7:
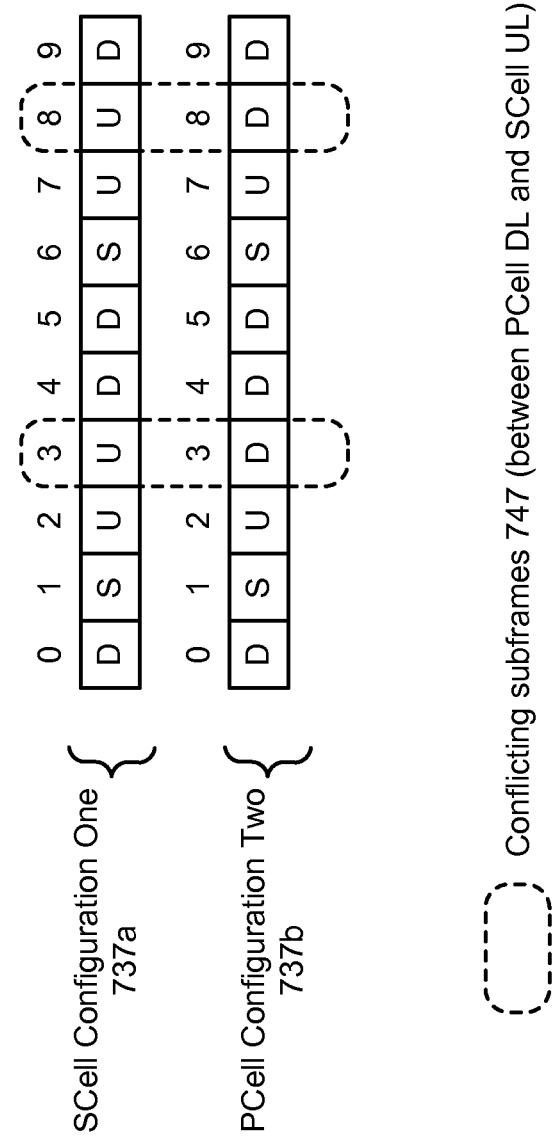
FIG. 7 is a diagram illustrating an example of conflicting subframes between a PCell configuration and an SCell configuration.

FIG. 7 is a diagram illustrating an example of conflicting subframes 747 between a PCell configuration 737*b* and an SCell configuration 737*a*. A conflicting subframe may occur when a subframe in one UL-DL configuration is a DL (or special subframe) and is an UL subframe in another UL-DL configuration. In this example, subframes 3 and 8 are conflicting subframes 747 between SCell configuration one 737*a* and PCell configuration two 737*b*, since subframes 3 and 8 are UL subframes in SCell configuration one 737*a* and PCell configuration two 737*b*.

In accordance with the systems and methods disclosed herein, a number of conflicting subframes m may be utilized in some of the approaches described above. For example, the feedback parameter $M_c$ of an SCell may be defined as $M_{Eff}$, where $M_{Eff}$ is the effective M of the reference configuration for which the PDSCH HARQ-ACK timing is followed excluding the conflicting subframes where the PCell configuration or reference configuration includes a DL subframe (or special subframe, for example) and the SCell configuration includes an UL subframe (e.g., $M_{Eff}=M_{Ref}-m$). In FIG. 7, DL subframes are denoted with a "D," UL subframes are denoted with a "U," and special subframes (which may include both an UL component and a DL component, for example) are denoted as an "S" for convenience.

Figure 8:
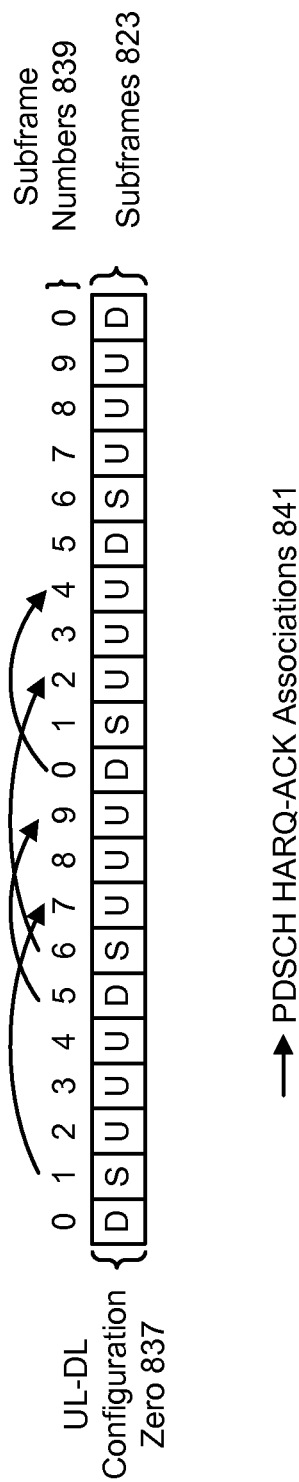
FIG. 8 is a diagram illustrating Physical Downlink Shared Channel (PDSCH) Hybrid Automatic Repeat Request Acknowledgement/Negative Acknowledgement (HARQ-ACK) reporting with UL-DL configuration zero.

FIG. 8 is a diagram illustrating PDSCH HARQ-ACK reporting with UL-DL configuration zero 837. In particular, FIG. 8 illustrates UL-DL configuration zero 837 (e.g., "UL-DL configuration 0") with subframes 823 and subframe numbers 839. FIG. 8 further illustrates PDSCH HARQ-ACK associations 841 (for PDSCH HARQ-ACK feedback on PUCCH or PUSCH, for example). The PDSCH HARQ-ACK associations 841 may indicate HARQ-ACK reporting subframes corresponding to subframes for PDSCH transmissions (e.g., subframes in which PDSCH transmissions may be sent and/or received).

More detail is given hereafter regarding HARQ-ACK reporting in subframes 3 and 8 if the PCell is configured with UL-DL configuration zero 837 (e.g., "0") in accordance with the systems and methods disclosed herein. In UL-DL configuration zero 837, there is no DL subframe associated with subframes 3 and 8, as shown in FIG. 8. If the PCell is configured with UL-DL configuration zero 837, no PUCCH resource is allocated for the PCell. However, with eCA with different UL-DL configurations, the HARQ-ACK of one or more SCells may be reported on the PCell. Table (4) above illustrates possible combinations with SCell reporting when the PCell is configured with UL-DL configuration zero 837. In other words, Table (4) illustrates cases with no HARQ-ACK on the PCell, when the PCell configuration is configuration zero 837.

In LTE Rel-10 CA, all cells have the same UL-DL configuration. A UE may use either PUCCH Format 3 or PUCCH Format 1a/1b with channel selection. If UL-DL configuration 0 is configured on the PCell, the PDSCH HARQ-ACK timing of an SCell may follow the SCell configuration. If PUCCH Format 3 is configured for the UE, there are several approaches for HARQ-ACK reporting.

One approach involves always applying PUCCH Format 3 and HARQ-ACK multiplexing of all cells. In this approach, the number of HARQ-ACKs on the PCell should be 0 in UL subframes 3 and 8 with UL-DL configuration 6 as the PCell configuration. Thus, the UE 102 may multiplex and report only HARQ-ACK bits of one or more SCells using Format 3. This can be viewed as an extension of Rel-10. However, Format 3 may be used even for reporting one or two bits from an SCell only. This may unnecessarily waste PUCCH resources.

In LTE Rel-10, a fallback mode is defined for the PCell under CA. In case a PDSCH transmission only on the PCell is received, Format 1a/1b and Format 1a/1b with channel selection may be applied instead of Format 3. In another approach, this principle may be extended to the HARQ-ACK reporting in subframe 3 and 8 when UL-DL configuration 0 is configured on the PCell and there are only two configured serving cells. For more than two configured serving cells, PUCCH Format 3 may be applied.

Therefore, in subframes 3 and 8, when UL-DL configuration 0 is configured on the PCell and only two cells are configured, the UE 102 may apply PUCCH Format 1a/1b and PUCCH resource $n_{PUCCH}^{(1,\tilde{p})}$ in the following cases. In one case, the UE 102 may apply PUCCH Format 1a/1b and PUCCH resource $n_{PUCCH}^{(1,\tilde{p})}$ for a single PDSCH transmission only on the SCell indicated by the detection of a corresponding PDCCH in subframe n−$k_m$ (where $k_m \in K$ according to the SCell UL-DL configuration) and for UL-DL configurations 1-6, where the Downlink Assignment Index (DAI) value in the PDCCH is equal to '1' (defined in Table 7.3-X of 3GPP TS 36.213, for example). In other words, when UL-DL configuration 0 is configured on the PCell and only two cells are configured, in subframes 3 and 8, if $M_{SCell}=1$, PUCCH Format 1a/1b may be used instead of Format 3.

In subframes 3 and 8, when UL-DL configuration 0 is configured on the PCell and only two cells are configured, for $M_{SCell}>1$, a single cell channel selection approach may be applied and PUCCH Format 1b may be applied with channel selection (according to the set of Tables 10.1.3-2, 3 and 4 or the set of Tables 10.1.3-5, 6 and 7 of 3GPP TS 36.213 based on higher layer signaling). For the selected table set indicated by higher layer signaling, the UE may transmit b(0),b(1) on PUCCH resource $n_{PUCCH}^{(1)}$ in subframe n using PUCCH Format 1b. The value of b(0),b(1) and the PUCCH resource $n_{PUCCH}^{(1)}$ are generated by channel selection according to the selected set of Tables for $M_{SCell}=2$, 3, and 4, respectively.

Figure 9:
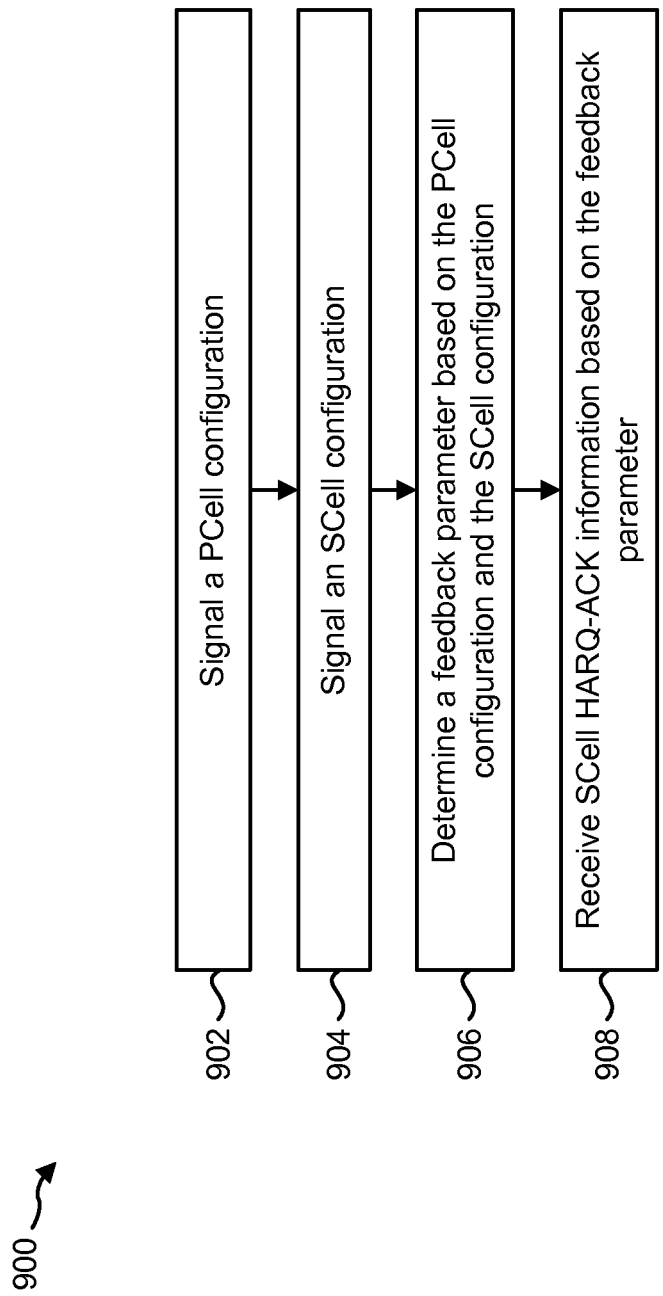
FIG. 9 is a flow diagram illustrating one configuration of a method for receiving feedback information.

FIG. 9 is a flow diagram illustrating one configuration of a method 900 for receiving feedback information. An eNB 160 may signal 902 a PCell configuration. For example, the eNB 160 may send a SIB-1 that assigns an UL-DL configuration corresponding to a PCell.

The eNB 160 may signal 904 an SCell configuration. For example, the eNB 160 may send RRC dedicated signaling that assigns an UL-DL configuration corresponding to an SCell. The method 900 may be performed when the PCell configuration and the SCell configuration are different.

The eNB 160 may determine 906 a feedback parameter based on the PCell configuration and the SCell configuration. For example, the eNB 160 may determine 906 the feedback parameter based on whether a set of DL subframes for the SCell configuration is a subset of a set of DL subframes for the PCell configuration (case A), whether a set of DL subframes for the PCell configuration is a subset of a set of DL subframes for the SCell configuration (case B) or neither (case C).

In some implementations, the eNB 160 may determine 906 a feedback parameter in accordance with one or more of the approaches described above. The feedback parameter may indicate a number of subframes that require PDSCH HARQ-ACK feedback for the SCell for a particular UL-DL configuration in a given uplink subframe. For instance, the eNB 160 may determine the feedback parameter of an SCell as a reference parameter. The reference parameter may indicate a number of subframes with a PDSCH HARQ-ACK association for a reference configuration.

For example, the reference parameter may be set to a PCell parameter if a set of DL subframes for the SCell configuration is a subset of a set of DL subframes for the PCell configuration (e.g., case A). Alternatively, the reference parameter may be set to an SCell parameter if a set of DL subframes for the PCell configuration is a subset of a set of DL subframes for the SCell configuration (e.g., case B). Alternatively, the reference parameter may be set to a predetermined parameter if a set of DL subframes for the SCell configuration is neither a subset nor a superset of a set of DL subframes for the PCell configuration (e.g., case C).

In some implementations, a similar approach may be applied for cross-carrier scheduling. For example, the eNB 160 may determine 906 a feedback parameter based on a similar approach when the SCell is cross-carrier scheduled. Alternatively, the eNB 160 may determine 906 the feedback parameter as a scheduling cell parameter when the SCell is cross-carrier scheduled.

In some implementations, the eNB 160 may determine 906 the feedback parameter based on a number of conflicting subframes. For example, the eNB 160 may determine a reference parameter as described above and may set the feedback parameter equal to the reference parameter minus a number of conflicting subframes. In other words, this may be a number of downlink subframes and special subframes with PDSCH HARQ-ACK associations for an SCell that is following a reference configuration, excluding the conflicting subframes. Conflicting subframes may be subframes that are DL subframes and special subframes in the reference configuration and are UL subframes in the SCell configuration.

In some configurations, the eNB 160 may signal the determined feedback parameter to the UE 102 (by higher layer signaling, for example). In these configurations, the UE 102 may follow the given parameters (e.g., the feedback parameter) signaled by the eNB 160. For instance, the same parameters may be used by the eNB 160 and the UE 102.

The eNB 160 may receive 908 SCell HARQ-ACK information based on the feedback parameter. For example, the feedback parameter may specify the number of subframes for HARQ-ACK feedback for the SCell. For instance, the feedback parameter may be utilized to determine the number of HARQ-ACK bits that are reported for the SCell. The HARQ-ACK bits of the SCell may be multiplexed with the HARQ-ACK bits of the PCell and received 908 in an uplink report based on the feedback parameter.

Figure 10:
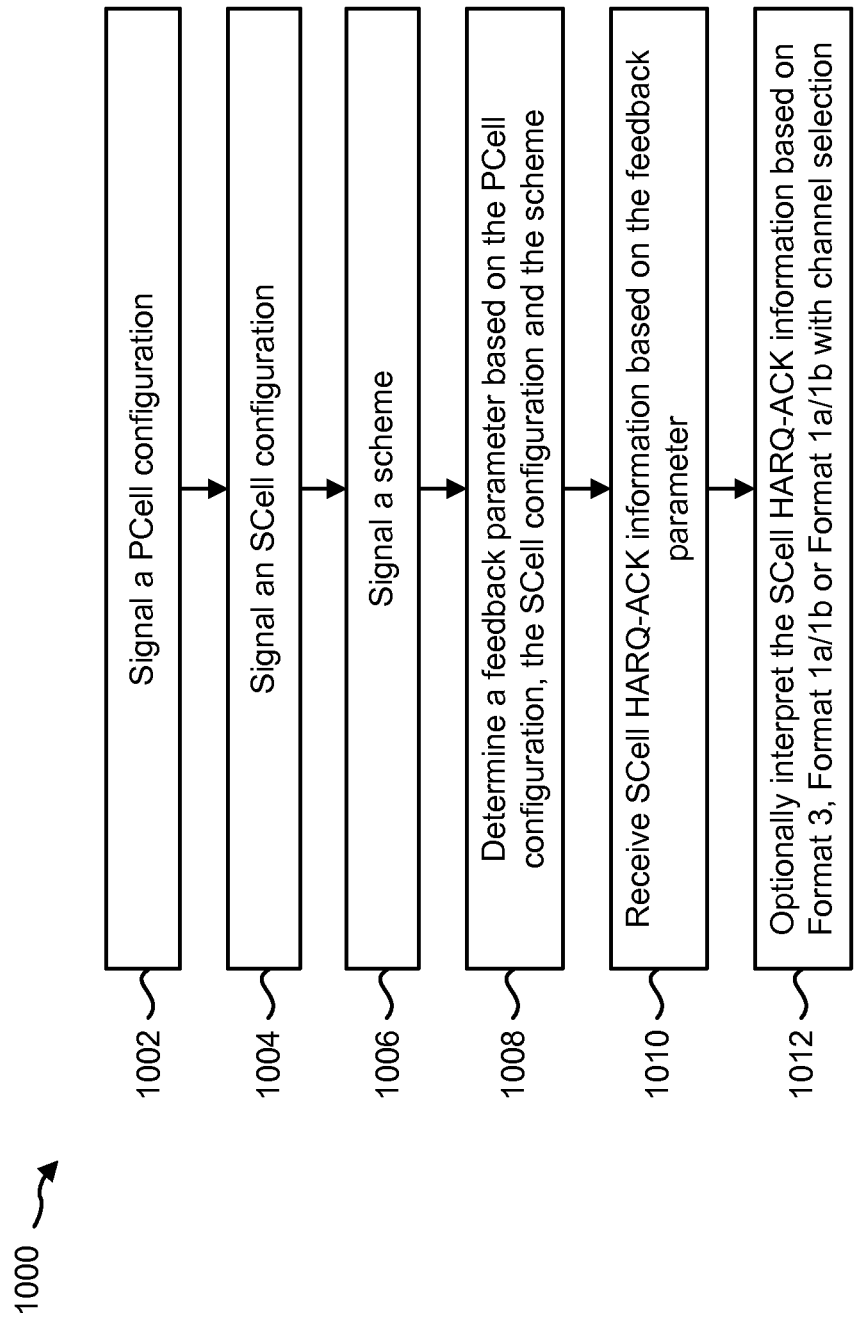
FIG. 10 is a flow diagram illustrating a more specific configuration of a method for receiving feedback information.

FIG. 10 is a flow diagram illustrating a more specific configuration of a method 1000 for receiving feedback information. An eNB 160 may signal 1002 a PCell configuration. For example, the eNB 160 may send a SIB-1 that assigns an UL-DL configuration corresponding to a PCell.

The eNB 160 may signal 1004 an SCell configuration. For example, the eNB 160 may send RRC dedicated signaling that assigns an UL-DL configuration corresponding to an SCell. The remaining method 1000 steps may be performed when the PCell configuration and the SCell configuration are different.

The eNB 160 may signal 1006 a scheme. In some implementations, one of multiple feedback parameter determination schemes may be utilized. In these implementations, the eNB 160 may signal which scheme is utilized. For example, the eNB 160 may send a feedback parameter determination scheme indicator that indicates whether the feedback parameter (e.g., $M_c$) is determined based on a reference parameter (e.g., $M_{Ref}$) or based on the reference parameter and a number of conflicting subframes (e.g., $M_{Eff}=M_{Ref}-m$). In other implementations, only one feedback parameter determination scheme may be utilized by the eNB 160 and UE 102. In these implementations, the eNB 160 may not signal a scheme.

The eNB 160 may determine 1008 a feedback parameter based on the PCell configuration, the SCell configuration and the scheme (if multiple feedback parameter determination schemes are utilized, for instance). For example, the eNB 160 may determine 1008 the feedback parameter based on whether a set of DL subframes for the SCell configuration is a subset of a set of DL subframes for the PCell configuration (case A), whether a set of DL subframes for the PCell configuration is a subset of a set of DL subframes for the SCell configuration (case B) or neither (case C).

Furthermore, the feedback parameter (e.g., $M_c$) may be determined 1008 based on the scheme. For example, the eNB 160 may determine 1008 the feedback parameter (e.g., $M_c$) based on a reference parameter (e.g., $M_{Ref}$) or based on the reference parameter and a number of conflicting subframes (e.g., $M_{Eff}=M_{Ref}-m$) in accordance with the feedback determination scheme that is selected and signaled 1006.

In some approaches, the eNB 160 may determine 1008 a feedback parameter based on a reference parameter as follows. In particular, the feedback parameter $M_c$ may be determined in accordance with one or more of the approaches described above. $M_c$ may indicate a number of subframes that require PDSCH HARQ-ACK feedback for cell c (e.g., the SCell) for an UL-DL configuration in a given uplink subframe. For instance, the eNB 160 may determine 1008 the feedback parameter $M_c$ of an SCell as the reference parameter, $M_{Ref}$. $M_{Ref}$ may indicate a number of subframes with a PDSCH HARQ-ACK association for a reference configuration.

The eNB 160 may determine whether a set of DL subframes for the SCell configuration is a subset of a set of DL subframes for the PCell configuration. For example, the eNB 160 may determine whether all of the DL subframes (or special subframes) specified by the SCell configuration (as shown in Table (1)) are also DL subframes (or special subframes) specified by the PCell configuration (as shown in Table (1)). For instance, the eNB 160 may determine whether the SCell configuration and PCell configuration correspond to case A as shown in Table (2).

If the set of DL subframes for the SCell configuration is a subset of a set of DL subframes for the PCell configuration (case A), then the eNB 160 may set the reference parameter to a PCell parameter. For example, the reference parameter $M_{Ref}$ may be set to the PCell parameter $M_{PCell}$ if a set of DL subframes for the SCell configuration is a subset of a set of DL subframes for the PCell configuration (case A).

If the set of DL subframes for the SCell configuration is not a subset of a set of DL subframes for the PCell configuration, the eNB 160 may determine whether the set of DL subframes for the PCell configuration is a subset of a set of DL subframes for the SCell configuration. If the set of DL subframes for the PCell configuration is a subset of a set of DL subframes for the SCell configuration (case B), then the eNB 160 may set the reference parameter to an SCell parameter. For example, the reference parameter $M_{Ref}$ may be set to the SCell parameter $M_{SCell}$ if a set of DL subframes for the PCell configuration is a subset of a set of DL subframes for the SCell configuration (case B).

If the set of DL subframes for the PCell configuration is not a subset of a set of DL subframes for the SCell configuration, the eNB 160 may set the reference parameter to a predetermined parameter. For example, the reference parameter $M_{Ref}$ may be set to a predetermined parameter $M_{RefConf}$ if a set of DL subframes for the SCell configuration is neither a subset nor a superset of a set of DL subframes for the PCell configuration (case C). It should be noted that the predetermined parameter $M_{RefConf}$ may correspond to a reference configuration specified in Table (2) for case C.

In some implementations, the eNB 160 may determine the feedback parameter based on a number of conflicting subframes m and the reference parameter $M_{Ref}$. For example, the eNB 160 may determine the reference parameter $M_{Ref}$ as described above and may set the feedback parameter $M_c$ equal to $M_{Eff}=M_{Ref}-m$. In other words, $M_{Eff}$ may be a number of downlink subframes and special subframes with PDSCH HARQ-ACK associations for an SCell that is following a reference configuration, excluding the conflicting subframes. Conflicting subframes may be subframes that are DL subframes or special subframes in the reference configuration and are UL subframes in the SCell configuration.

In some implementations, a similar approach may be applied for cross-carrier scheduling. For example, the eNB 160 may determine a feedback parameter based on a reference parameter $M_{Ref}$ (in addition to or alternatively from a number of conflicting subframes m) when the SCell is cross-carrier scheduled. Alternatively, the eNB 160 may determine the feedback parameter as a scheduling cell parameter $M_{SchedulingCell}$ when the SCell is cross-carrier scheduled. $M_{SchedulingCell}$ may be a number of subframes with a PDSCH HARQ-ACK association for a scheduling cell (UL-DL) configuration. In a case where the scheduling cell is not the PCell, the ($M_c$ of the) PDSCH reporting reference configuration of the scheduling cell may be used instead of the ($M_c$ of the) scheduling cell configuration. In another implementation, the feedback parameter $M_c$ of the SCell may be $M_{Eff\_SchedulingCell}$, where $M_{Eff\_SchedulingCell}$ is the $M_{Eff}$ of the scheduling cell (where $M_{Eff}$ is the effective M of the scheduling cell (e.g., the PCell) configuration for which the PDSCH HARQ-ACK timing is followed, excluding the conflicting subframes, for example). In this case, a conflicting subframe may be a subframe that is a DL or special subframe in the scheduling cell configuration and is an UL subframe in the SCell configuration. In a case where the scheduling cell is not the PCell, the $M_c$ of the PDSCH reporting reference configuration of the scheduling cell may be used instead of the $M_c$ of the scheduling cell configuration.

The eNB 160 may receive 1010 SCell HARQ-ACK information based on the feedback parameter. For example, the feedback parameter may specify the number of subframes for HARQ-ACK feedback for the SCell. For instance, the feedback parameter may be utilized to determine the number of HARQ-ACK bits that are reported for the SCell. The HARQ-ACK bits of the SCell may be multiplexed with the HARQ-ACK bits of the PCell and received 1010 in an uplink report based on the feedback parameter.

In some implementations, the eNB 160 may optionally interpret 1012 the SCell HARQ-ACK information based on Format 3, Format 1a/1b or Format 1a/1b with channel selection. For example, utilizing TDD CA with different UL-DL configurations may cause several issues due to different parameters on different cells. For instance, if PUCCH Format 3 is configured, HARQ-ACK multiplexing (e.g., demultiplexing performed by the eNB 160) may need to take into account whether the conflicting subframes (e.g., with PCell DL and SCell UL) are reported or counted in the HARQ-ACK bits. Furthermore, if the PCell configuration is configuration 0, subframes 3 and 8 have no HARQ-ACK to be reported on the PCell. Thus, they may include HARQ-ACK bits only corresponding to the SCell. Special handling may be needed.

More detail regarding PUCCH Format 3 HARQ-ACK multiplexing is given as follows. If PUCCH Format 3 is configured for a UE, the HARQ-ACK bits of cells may be multiplexed with carrier aggregation. The number of HARQ-ACK bits of each cell may be determined based on M.

For TDD, when PUCCH Format 3 is configured for transmission of HARQ-ACK, the HARQ-ACK feedback bits $o_{c,0}^{ACK}\ o_{c,1}^{ACK}, \ldots, o_{c,O_c^{ACK}-1}^{ACK}$ for the c-th serving cell configured by RRC signaling may be constructed as follows. $c \geq 0$ and $O_c^{ACK}=B_c^{DL}$ if a transmission mode configured in the c-th serving cell supports one transport block or spatial HARQ-ACK bundling is applied, and $O_c^{ACK}=2B_c^{DL}$ otherwise. $B_c^{DL}$ is the number of downlink subframes for which the UE 102 needs to feedback HARQ-ACK bits for the c-th serving cell.

In Rel-10, for the case that the UE 102 is transmitting on PUCCH, $B_c^{DL}=M$, where M is the number of elements in the set K defined in Table (3) associated with subframe n and the set K does not include a special subframe of configurations 0 and 5 with a normal downlink cyclic prefix (CP) or of configurations 0 and 4 with extended downlink CP. Otherwise, $B_c^{DL}=M-1$.

In LTE Rel-10, M is the same for all cells. With eCA with different UL-DL configurations, however, the $M_c$ of each cell may be different. Approaches for determining $M_c$ are provided above. Accordingly, the approach to determine $M_c$ may impact PUCCH Format 3 HARQ-ACK multiplexing (and demultiplexing performed by the eNB 160). For the case that the UE 102 is transmitting on the PUCCH, $B_c^{DL}=M_c$, where $M_c$ is the number of elements in the set K defined in Table (3) associated with subframe n. In this case, the set K does not include the special subframe of configurations 0 and 5 with normal downlink CP or of configurations 0 and 4 with extended downlink CP. Otherwise, $B_c^{DL}=M_c-1$.

In one approach, the $M_c$ may be a selected $M_{Ref}$. Thus, $M_c$ of an SCell is $M_{PCell}$ in case A, $M_{SCell}$ in case B and $M_{RefConf}$ in case C, according to Table (2). This may provide the benefit of a simpler solution to reuse an existing table and determination of M according to the reference UL-DL configuration. On the other hand, there may be conflicting subframes between the PCell configuration or reference configuration with a DL subframe and an SCell configuration with an UL subframe. The HARQ-ACK bits may still need to be reported as DTX even if the PDSCH cannot be scheduled on the SCell. Thus, this approach may have higher HARQ-ACK payload on PUCCH Format 3, particularly when multiple cells are aggregated.

In another approach, $M_c$ may be selected as $M_{Eff}$ (e.g., the effective M of the reference configuration for which the PDSCH HARQ-ACK timing is followed), excluding the conflicting subframes (where the PCell or reference configuration includes a DL subframe (or special subframe) and the SCell configuration includes an UL subframe). This approach does not report HARQ-ACK bits in conflicting subframes (where the PCell configuration or reference configuration has a DL subframe and the SCell configuration includes an UL subframe). Thus, it reduces the HARQ-ACK payload on PUCCH Format 3, particularly when multiple cells are aggregated.

With cross-carrier scheduling and no cross-TTI scheduling or multiple subframe scheduling, the $M_c$ of the scheduled cell may be set as the $M_c$ of the scheduling cell. Similarly, the $M_{Ref}$ or the $M_{Eff}$ of the scheduling cell may be used as the $M_c$ of the scheduled cell. In cases where PUCCH HARQ-ACK Format 3 multiplexing is utilized as provided by the foregoing or following description, the eNB 160 may interpret 1012 the received 1010 SCell HARQ-ACK information by demultiplexing the SCell HARQ-ACK information based on Format 3.

More detail is given hereafter regarding PDSCH HARQ-ACK reporting in subframes 3 and 8 if the PCell is configured with UL-DL configuration 0 in accordance with the systems and methods disclosed herein. In UL-DL configuration 0, there is no DL subframe associated with subframes 3 and 8, as shown in FIG. 8. If the PCell is configured with UL-DL configuration 0, no PUCCH resource is allocated for the PCell. However, with eCA with different configurations, the HARQ-ACK of one or more SCells may be reported on the PCell. Table (4) illustrates possible combinations with SCell reporting when the PCell is configured with UL-DL configuration 0. In other words, Table (4) illustrates cases with no HARQ-ACK on the PCell, when the PCell configuration is configuration 0.

In LTE Rel-10 CA, all cells have the same UL-DL configuration. A UE may use either PUCCH Format 3 or PUCCH Format 1a/1b with channel selection. If UL-DL configuration 0 is configured on the PCell, the PDSCH HARQ-ACK timing of an SCell may follow the SCell configuration. If PUCCH Format 3 is configured for the UE 102, there are several approaches for HARQ-ACK reporting.

One approach involves always using PUCCH Format 3 and HARQ-ACK multiplexing of all cells. In this approach, the number of HARQ-ACKs on the PCell should be 0 in UL subframes 3 and 8 with UL-DL configuration 6 as the PCell configuration. Thus, only HARQ-ACK bits of one or more SCells are multiplexed and reported using Format 3. This can be viewed as an extension of Rel-10. However, Format 3 may be used even for reporting one or two bits from an SCell only. This may unnecessarily waste PUCCH resources.

In LTE Rel-10, a fallback mode is defined for the PCell under CA. In case a PDSCH transmission only on the PCell is received, Format 1a/1b and Format 1a/1b with channel selection may be applied instead of Format 3. In another approach, this principle may be extended to the HARQ-ACK reporting in subframe 3 and 8 when UL-DL configuration 0 is configured on the PCell and there are only two configured serving cells. For more than two configured serving cells, PUCCH Format 3 may be applied.

Therefore, in subframes 3 and 8, when UL-DL configuration 0 is configured on the PCell and only two cells are configured, the UE 102 may apply PUCCH Format 1a/1b and PUCCH resource $n_{PUCCH}^{(1,\tilde{p})}$ in the following cases. In one case, the UE 102 may apply PUCCH Format 1a/1b and PUCCH resource $n_{PUCCH}^{(1,\tilde{p})}$ for a single PDSCH transmission only on the SCell indicated by the detection of a corresponding PDCCH in subframe $n-k_m$ (where $k_m \in K$ according to the SCell UL-DL configuration) and for UL-DL configurations 1-6, where the DAI value in the PDCCH is equal to '1' (defined in Table 7.3-X of 3GPP TS 36.213, for example). In other words, when UL-DL configuration 0 is configured on the PCell and only two cells are configured, in subframes 3 and 8, if $M_{SCell}=1$, PUCCH Format 1a/1b may be used instead of Format 3.

In subframes 3 and 8, when UL-DL configuration 0 is configured on the PCell and only two cells are configured, for $M_{SCell}>1$, a single cell channel selection approach may be applied and PUCCH Format 1b may be applied with channel selection (according to the set of Tables 10.1.3-2, 3 and 4 or the set of Tables 10.1.3-5, 6 and 7 of 3GPP TS 36.213 based on higher layer signaling). For the selected table set indicated by higher layer signaling, the UE 102 may transmit b(0),b(1) on PUCCH resource $n_{PUCCH}^{(1)}$ in subframe n using PUCCH Format 1b. The value of b(0),b(1) and the PUCCH resource $n_{PUCCH}^{(1)}$ are generated by channel selection according to the selected set of Tables for $M_{SCell}=2$, 3, and 4, respectively.

In cases provided by the foregoing description (e.g., where the PCell configuration is 0 and only two cells are configured, etc.), the eNB 160 may interpret 1012 the received 1010 SCell HARQ-ACK information based on Format 3, Format 1a/1b or Format 1a/1b with channel selection. This may be done in order to correctly extract SCell HARQ-ACK information from received signals.

Figure 11:
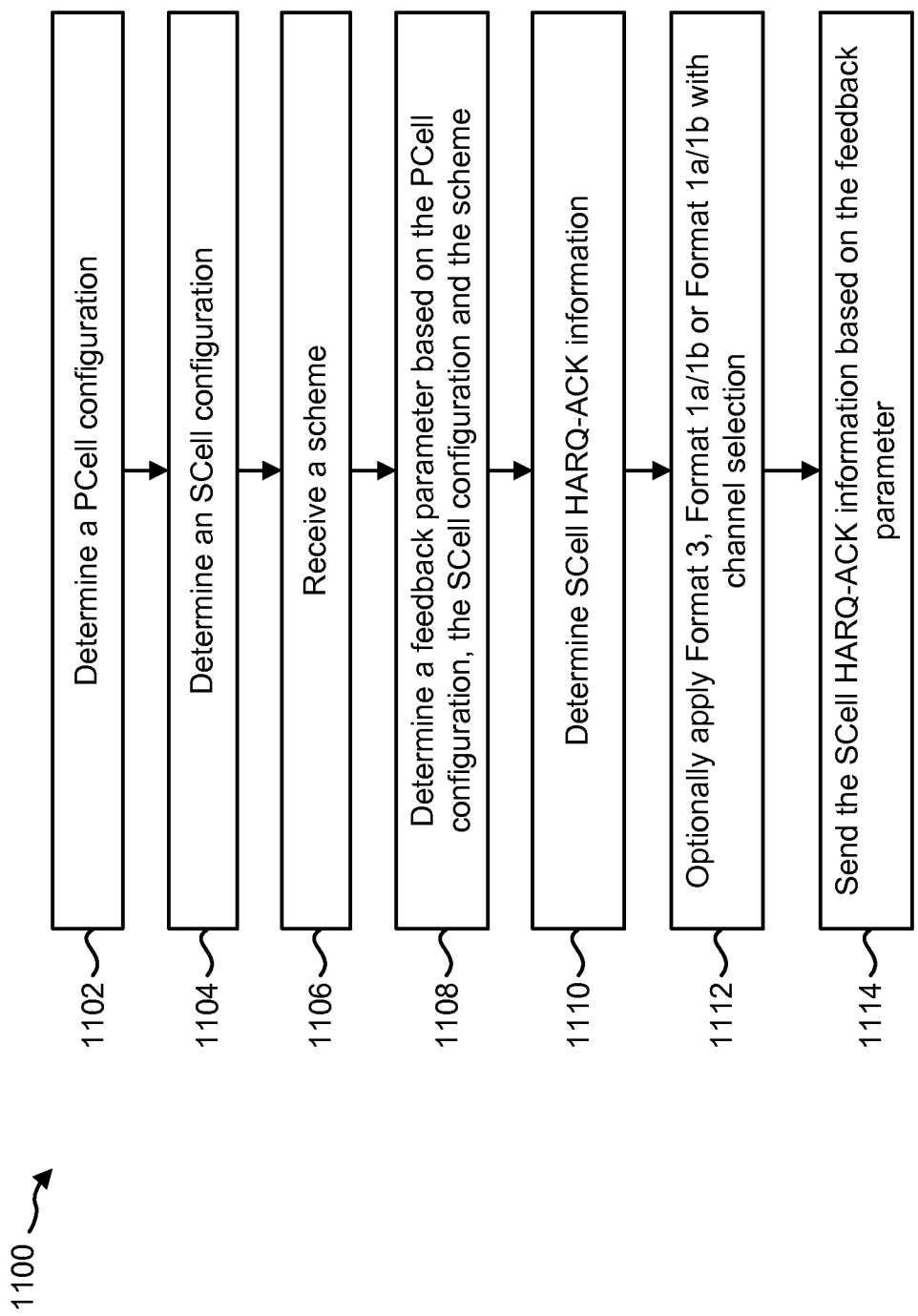
FIG. 11 is a flow diagram illustrating another more specific configuration of a method for sending feedback information.

FIG. 11 is a flow diagram illustrating another more specific configuration of a method 1100 for sending feedback information. A UE 102 may determine 1102 a PCell configuration. For example, the UE 102 may receive an RRC configuration (e.g., SIB-1 broadcasted information or dedicated signaling) and determine an UL-DL configuration corresponding to (e.g., assigned to, to be applied to) a PCell based on the RRC configuration.

The UE 102 may determine 1104 an SCell configuration. For example, the UE 102 may receive an RRC configuration (e.g., SIB-1 broadcasted information or dedicated signaling) and determine an UL-DL configuration corresponding to (e.g., assigned to, to be applied to) an SCell based on the RRC configuration. The remaining method 1100 steps may be performed when the PCell configuration and the SCell configuration are different.

The UE 102 may receive 1106 a scheme. In some implementations, one of multiple feedback parameter determination schemes may be utilized. In these implementations, the eNB 160 may signal which scheme is utilized. For example, the UE 102 may receive 1106 a feedback parameter determination scheme indicator that indicates whether the feedback parameter (e.g., $M_c$) is determined based on a reference parameter (e.g., $M_{Ref}$) or based on the reference parameter and a number of conflicting subframes (e.g., $M_{Eff}=M_{Ref}-m$). In other implementations, only one feedback parameter determination scheme may be utilized by the eNB 160 and UE 102. In these implementations, the UE 102 may not receive a scheme.

The UE 102 may determine 1108 a feedback parameter based on the PCell configuration, the SCell configuration and the scheme (if multiple feedback parameter determination schemes are utilized, for instance). For example, the UE 102 may determine 1108 the feedback parameter based on whether a set of DL subframes for the SCell configuration is a subset of a set of DL subframes for the PCell configuration (case A), whether a set of DL subframes for the PCell configuration is a subset of a set of DL subframes for the SCell configuration (case B) or neither (case C). This may be done as detailed above in connection with FIG. 2 or FIG. 3, for instance.

Furthermore, the feedback parameter (e.g., $M_c$) may be determined 1108 based on the scheme. For example, the UE 102 may determine 1108 the feedback parameter (e.g., $M_c$) based on a reference parameter (e.g., $M_{Ref}$) or based on the reference parameter and a number of conflicting subframes (e.g., $M_{Eff}=M_{Ref}-m$) in accordance with the feedback determination scheme that is received 1106.

The UE 102 may determine 1110 SCell HARQ-ACK information. For example, the UE 102 may determine 1110 SCell HARQ-ACK information as described above in connection with FIG. 2 or FIG. 3.

In some implementations, the UE 102 may optionally apply 1112 Format 3, Format 1a/1b or Format 1a/1b with channel selection to the SCell HARQ-ACK information. For example, utilizing TDD CA with different UL-DL configurations may cause several issues due to different parameters on different cells. For instance, if PUCCH Format 3 is configured, HARQ-ACK multiplexing (e.g., multiplexing performed by the UE 102) may need to take into account whether the conflicting subframes (e.g., with PCell DL and SCell UL) are reported or counted in the HARQ-ACK bits. Furthermore, if the PCell configuration is configuration 0, subframes 3 and 8 have no HARQ-ACK to be reported on the PCell. Thus, they may include HARQ-ACK bits only corresponding to the SCell. Special handling may be needed.

More detail regarding PUCCH Format 3 HARQ-ACK multiplexing is given as follows. If PUCCH Format 3 is configured for a UE 102, the HARQ-ACK bits of cells may be multiplexed with carrier aggregation by the UE 102. The number of HARQ-ACK bits of each cell may be determined based on M.

For TDD, when PUCCH Format 3 is configured for transmission of HARQ-ACK, the HARQ-ACK feedback bits $o_{c,0}^{ACK} o_{c,1}^{ACK}, \ldots, o_{c,O_c^{ACK}-1}^{ACK}$ for the c-th serving cell configured by RRC signaling may be constructed as follows. $c \geq 0$ and $O_c^{ACK}=B_c^{DL}$ if a transmission mode configured in the c-th serving cell supports one transport block or spatial HARQ-ACK bundling is applied and $O_c^{ACK}=2B_c^{DL}$ otherwise. $B_c^{DL}$ is the number of downlink subframes for which the UE 102 needs to feedback HARQ-ACK bits for the c-th serving cell.

In Rel-10, for the case that the UE 102 is transmitting on PUCCH, $B_c^{DL}=M$, where M is the number of elements in the set K defined in Table (3) associated with subframe n and the set K does not include a special subframe of configurations 0 and 5 with a normal downlink cyclic prefix (CP) or of configurations 0 and 4 with extended downlink CP. Otherwise, $B_c^{DL}=M-1$.

In LTE Rel-10, M is the same for all cells. With eCA with different UL-DL configurations, however, $M_C$ of each cell may be different. Approaches for determining $M_C$ are provided above. Accordingly, the approach to determine $M_c$ may impact PUCCH Format 3 HARQ-ACK multiplexing (performed by the UE 102). For the case that the UE 102 is transmitting on the PUCCH, $B_c^{DL}=M_c$, where $M_c$ is the number of elements in the set K defined in Table (3) associated with subframe n. In this case, the set K does not include the special subframe of configurations 0 and 5 with normal downlink CP or of configurations 0 and 4 with extended downlink CP. Otherwise, $B_c^{DL}=M_c-1$.

In one approach, the $M_c$ may be a selected $M_{Ref}$. Thus, $M_c$ of an SCell is $M_{PCell}$ in case A, $M_{SCell}$ in case B and in $M_{RefConf}$ in case C, according to Table (2). This may provide the benefit of a simpler solution to reuse an existing table and determination of M according to the reference UL-DL configuration. On the other hand, there may be conflicting subframes between the PCell configuration or reference configuration with a DL subframe and an SCell configuration with an UL subframe. The HARQ-ACK bits may still need to be reported as DTX even if the PDSCH cannot be scheduled on the SCell. Thus, this approach may have higher HARQ-ACK payload on PUCCH Format 3, particularly when multiple cells are aggregated.

In another approach, $M_c$ may be selected as $M_{Eff}$ (e.g., the effective M of the reference configuration for which the PDSCH HARQ-ACK timing is followed), excluding the conflicting subframes (where the PCell or reference configuration includes a DL subframe (or special subframe) and the SCell configuration includes an UL subframe). This approach does not report HARQ-ACK bits in conflicting subframes (where the PCell configuration or reference configuration has a DL subframe and the SCell configuration includes an UL subframe). Thus, it reduces the HARQ-ACK payload on PUCCH Format 3, particularly when multiple cells are aggregated.

With cross-carrier scheduling and no cross-TTI scheduling or multiple subframe scheduling, the $M_c$ of the scheduled cell may be set as the $M_c$ of the scheduling cell. Similarly, the $M_{Ref}$ or the $M_{Eff}$ of the scheduling cell may be used as the $M_c$ of the scheduled cell. In cases provided by the foregoing or following description, the UE 102 may apply PUCCH HARQ-ACK Format 3 multiplexing to the SCell HARQ-ACK information. In a case where the scheduling cell is not the PCell, the $M_c$ of the PDSCH reporting reference configuration of the scheduling cell may be used instead of the $M_c$ of the scheduling cell configuration.

More detail is given hereafter regarding PDSCH HARQ-ACK reporting in subframes 3 and 8 if the PCell is configured with UL-DL configuration 0 in accordance with the systems and methods disclosed herein. In UL-DL configuration 0, there is no DL subframe associated with subframes 3 and 8, as shown in FIG. 8. If the PCell is configured with UL-DL configuration 0, no PUCCH resource is allocated for the PCell. However, with eCA with different configurations, the HARQ-ACK of one or more SCells may be reported on the PCell. Table (4) illustrates possible combinations with SCell reporting when the PCell is configured with UL-DL configuration 0. In other words, Table (4) illustrates cases with no HARQ-ACK on the PCell, when the PCell configuration is configuration 0.

In LTE Rel-10 CA, all cells have the same UL-DL configuration. A UE 102 may apply 1112 either PUCCH Format 3 or PUCCH Format 1a/1b with channel selection. If UL-DL configuration 0 is configured on the PCell, the PDSCH HARQ-ACK timing of an SCell may follow the SCell configuration. If PUCCH Format 3 is configured for the UE 102, there are several approaches for HARQ-ACK reporting.

One approach involves always using PUCCH Format 3 and HARQ-ACK multiplexing of all cells. In this approach, the number of HARQ-ACKs on the PCell should be 0 in UL subframes 3 and 8 with UL-DL configuration 6 as the PCell configuration. Thus, only HARQ-ACK bits of one or more SCells are multiplexed and reported using Format 3. This can be viewed as an extension of Rel-10. However, Format 3 may be used even for reporting one or two bits from an SCell only. This may unnecessarily waste PUCCH resources.

In LTE Rel-10, a fallback mode is defined for the PCell under CA. In case a PDSCH transmission only on the PCell is received, Format 1a/1b and Format 1a/1b with channel selection may be applied 1112 instead of Format 3. In another approach, this principle may be extended to the HARQ-ACK reporting in subframe 3 and 8 when UL-DL configuration 0 is configured on the PCell and there are only two configured serving cells. For more than two configured serving cells, PUCCH Format 3 may be applied 1112.

Therefore, in subframes 3 and 8, when UL-DL configuration 0 is configured on the PCell and only two cells are configured, the UE 102 may apply 1112 PUCCH Format 1a/1b and PUCCH resource $n_{PUCCH}^{(1,\tilde{p})}$ in the following cases. In one case, the UE 102 may apply 1112 PUCCH Format 1a/1b and PUCCH resource $n_{PUCCH}^{(1,\tilde{p})}$ for a single PDSCH transmission only on the SCell indicated by the detection of a corresponding PDCCH in subframe $n-k_m$ (where $k_m \in K$ according to the SCell UL-DL configuration) and for UL-DL configurations 1-6, where the DAI value in the PDCCH is equal to '1' (defined in Table 7.3-X of 3GPP TS 36.213, for example). In other words, when UL-DL configuration 0 is configured on the PCell and only two cells are configured, in subframes 3 and 8, if $M_{SCell}=1$, PUCCH Format 1a/1b may be used instead of Format 3.

In subframes 3 and 8, when UL-DL configuration 0 is configured on the PCell and only two cells are configured, for $M_{SCell}$>1, a single cell channel selection approach may be applied and PUCCH Format 1b may be applied 1112 with channel selection (according to the set of Tables 10.1.3-2, 3 and 4 or the set of Tables 10.1.3-5, 6 and 7 of 3GPP TS 36.213 based on higher layer signaling). For the selected table set indicated by higher layer signaling, the UE 102 may transmit b(0),b(1) on PUCCH resource $n_{PUCCH}^{(1)}$ in subframe n using PUCCH Format 1b. The value of b(0),b(1) and the PUCCH resource $n_{PUCCH}^{(1)}$ are generated by channel selection according to the selected set of Tables for $M_{SCell}$=2, 3, and 4, respectively.

The UE 102 may send 1114 the SCell HARQ-ACK information based on the feedback parameter. For example, the feedback parameter may specify the number of subframes to feedback HARQ-ACK for the SCell. For instance, the feedback parameter may be utilized to determine the number of HARQ-ACK bits to be reported for the SCell. The HARQ-ACK bits of the SCell may then be multiplexed with the HARQ-ACK bits of the PCell and reported in an uplink report.

Figure 12:
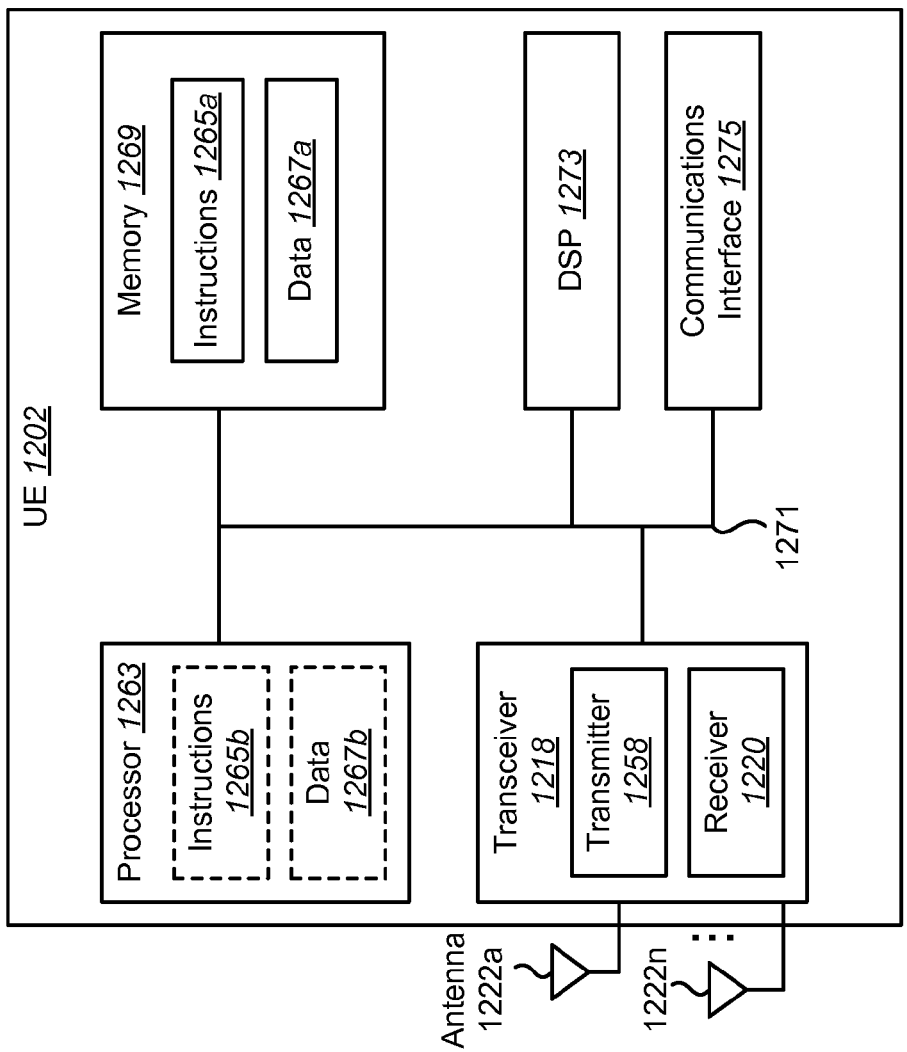
FIG. 12 illustrates various components that may be utilized in a UE.

FIG. 12 illustrates various components that may be utilized in a UE 1202. The UE 1202 described in connection with FIG. 12 may be implemented in accordance with the UE 102 described in connection with FIG. 1. The UE 1202 includes a processor 1263 that controls operation of the UE 1202. The processor 1263 may also be referred to as a central processing unit (CPU). Memory 1269, which may include read-only memory (ROM), random access memory (RAM), a combination of the two or any type of device that may store information, provides instructions 1265a and data 1267a to the processor 1263. A portion of the memory 1269 may also include non-volatile random access memory (NVRAM). Instructions 1265b and data 1267b may also reside in the processor 1263. Instructions 1265b and/or data 1267b loaded into the processor 1263 may also include instructions 1265a and/or data 1267a from memory 1269 that were loaded for execution or processing by the processor 1263. The instructions 1265b may be executed by the processor 1263 to implement one or more of the methods 200, 300, 1100 described above.

The UE 1202 may also include a housing that contains one or more transmitters 1258 and one or more receivers 1220 to allow transmission and reception of data. The transmitter(s) 1258 and receiver(s) 1220 may be combined into one or more transceivers 1218. One or more antennas 1222a-n are attached to the housing and electrically coupled to the transceiver 1218.

The various components of the UE 1202 are coupled together by a bus system 1271, which may include a power bus, a control signal bus and a status signal bus, in addition to a data bus. However, for the sake of clarity, the various buses are illustrated in FIG. 12 as the bus system 1271. The UE 1202 may also include a digital signal processor (DSP) 1273 for use in processing signals. The UE 1202 may also include a communications interface 1275 that provides user access to the functions of the UE 1202. The UE 1202 illustrated in FIG. 12 is a functional block diagram rather than a listing of specific components.

Figure 13:
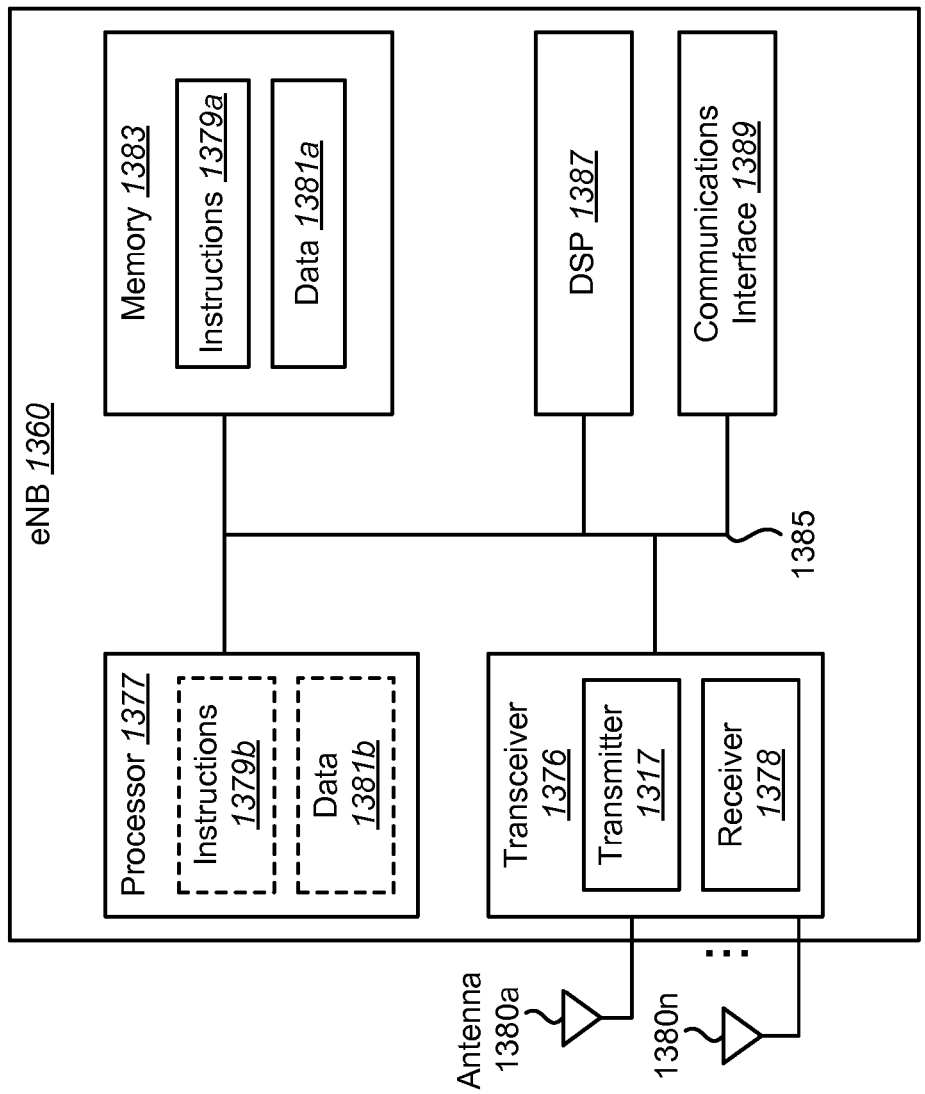
FIG. 13 illustrates various components that may be utilized in an eNB.

FIG. 13 illustrates various components that may be utilized in an eNB 1360. The eNB 1360 described in connection with FIG. 13 may be implemented in accordance with the eNB 160 described in connection with FIG. 1. The eNB 1360 includes a processor 1377 that controls operation of the eNB 1360. The processor 1377 may also be referred to as a central processing unit (CPU). Memory 1383, which may include read-only memory (ROM), random access memory (RAM), a combination of the two or any type of device that may store information, provides instructions 1379a and data 1381a to the processor 1377. A portion of the memory 1383 may also include non-volatile random access memory (NVRAM). Instructions 1379b and data 1381b may also reside in the processor 1377. Instructions 1379b and/or data 1381b loaded into the processor 1377 may also include instructions 1379a and/or data 1381a from memory 1383 that were loaded for execution or processing by the processor 1377. The instructions 1379b may be executed by the processor 1377 to implement one or more of the methods 900, 1000 described above.

The eNB 1360 may also include a housing that contains one or more transmitters 1317 and one or more receivers 1378 to allow transmission and reception of data. The transmitter(s) 1317 and receiver(s) 1378 may be combined into one or more transceivers 1376. One or more antennas 1380a-n are attached to the housing and electrically coupled to the transceiver 1376.

The various components of the eNB 1360 are coupled together by a bus system 1385, which may include a power bus, a control signal bus and a status signal bus, in addition to a data bus. However, for the sake of clarity, the various buses are illustrated in FIG. 13 as the bus system 1385. The eNB 1360 may also include a digital signal processor (DSP) 1387 for use in processing signals. The eNB 1360 may also include a communications interface 1389 that provides user access to the functions of the eNB 1360. The eNB 1360 illustrated in FIG. 13 is a functional block diagram rather than a listing of specific components.

Figure 14:
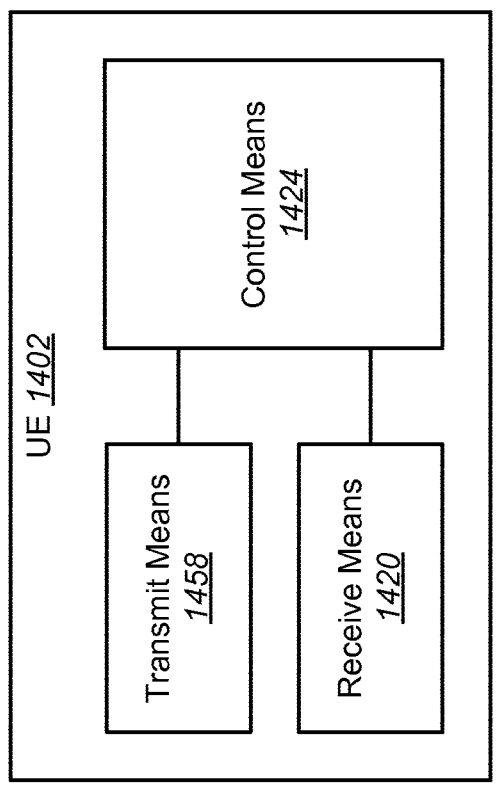
FIG. 14 is a block diagram illustrating one configuration of a UE in which systems and methods for sending feedback information may be implemented.

FIG. 14 is a block diagram illustrating one configuration of a UE 1402 in which systems and methods for sending feedback information may be implemented. The UE 1402 includes transmit means 1458, receive means 1420 and control means 1424. The transmit means 1458, receive means 1420 and control means 1424 may be configured to perform one or more of the functions described in connection with FIG. 2, FIG. 3, FIG. 11 and FIG. 12 above. FIG. 12 above illustrates one example of a concrete apparatus structure of FIG. 14. Other various structures may be implemented to realize one or more of the functions of FIG. 2, FIG. 3, FIG. 11 and FIG. 12. For example, a DSP may be realized by software.

Figure 15:
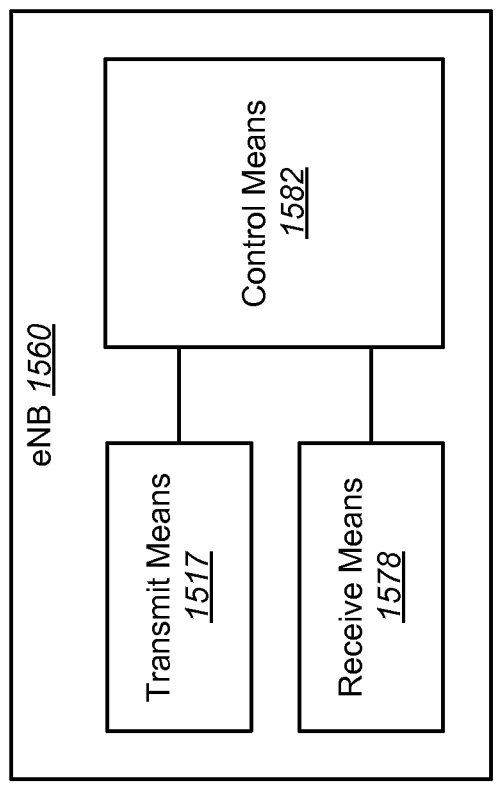
FIG. 15 is a block diagram illustrating one configuration of an eNB in which systems and methods for receiving feedback information may be implemented.

FIG. 15 is a block diagram illustrating one configuration of an eNB 1560 in which systems and methods for receiving feedback information may be implemented. The eNB 1560 includes transmit means 1517, receive means 1578 and control means 1582. The transmit means 1517, receive means 1578 and control means 1582 may be configured to perform one or more of the functions described in connection with FIG. 9, FIG. 10 and FIG. 13 above. FIG. 13 above illustrates one example of a concrete apparatus structure of FIG. 15. Other various structures may be implemented to realize one or more of the functions of FIG. 9, FIG. 10 and FIG. 13. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A User Equipment (UE) for sending information to an evolved Node B, the UE comprising:
    an operator configured to determine a Time-Division Duplexing (TDD) uplink-downlink (UL-DL) configuration of a primary cell (PCell) and a TDD UL-DL configuration of a secondary cell (SCell), wherein the TDD UL-DL configuration of the SCell is different from the TDD UL-DL configuration of the PCell; and
    a transmitter configured to transmit Hybrid Automatic Repeat Request Acknowledgement/Negative Acknowledgement information in an uplink subframe n for a cell, wherein the uplink subframe n corresponds to a subframe n−k of a Physical Downlink Shared Channel (PDSCH), wherein a set K includes one or more values of k such that the subframe n−k corresponds to a downlink subframe or a special subframe for the cell; wherein
    the set K for the PCell is determined based on the TDD UL-DL configuration of the PCell and the set K for the SCell is determined based on a TDD UL-DL configuration determined based on the TDD UL-DL configuration of the PCell and the TDD UL-DL configuration of the SCell.

2. An evolved Node B (eNB) for receiving information from a User Equipment, the eNB comprising:
    an operator configured to determine a Time-Division Duplexing (TDD) uplink-downlink (UL-DL) configuration of a primary cell (PCell) and a TDD UL-DL configuration of a secondary cell (SCell), wherein the TDD UL-DL configuration of the SCell is different from the TDD UL-DL configuration of the PCell; and
    a receiver configured to receive Hybrid Automatic Repeat Request Acknowledgement/Negative Acknowledgement (HARQ-ACK) information in an uplink subframe n for a cell, wherein the uplink subframe n corresponds to a subframe n−k of a Physical Downlink Shared Channel (PDSCH), wherein a set K includes one or more values of k such that the subframe n−k corresponds to a downlink subframe or a special subframe for the cell; wherein
    the set K for the PCell is determined based on the TDD UL-DL configuration of the PCell and the set K for the SCell is determined based on a TDD UL-DL configuration determined based on the TDD UL-DL configuration of the PCell and the TDD UL-DL configuration of the SCell.

3. A method for sending information by a User Equipment, the method comprising:
    determining a Time-Division Duplexing (TDD) uplink-downlink (UL-DL) configuration of a primary cell (PCell) and a TDD UL-DL configuration of a secondary cell (SCell), wherein the TDD UL-DL configuration of the SCell is different from the TDD UL-DL configuration of the PCell;
    transmitting Hybrid Automatic Repeat Request Acknowledgement/Negative Acknowledgement (HARQ-ACK) information in an uplink subframe n for a cell, wherein the uplink subframe n corresponds to a subframe n−k of a Physical Downlink Shared Channel (PDSCH), wherein a set K includes one or more values of k such that the subframe n−k corresponds to a downlink subframe or a special subframe for the cell; wherein
    the set K for the PCell is determined based on the TDD UL-DL configuration of the PCell and the set K for the SCell is determined based on a TDD UL-DL configuration determined based on the TDD UL-DL configuration of the PCell and the TDD UL-DL configuration of the SCell.

4. A method for receiving information by an evolved Node B, the method comprising:
    determining a Time-Division Duplexing (TDD) uplink-downlink (UL-DL) configuration of a primary cell (PCell) and a TDD UL-DL configuration of a secondary cell (SCell), wherein the TDD UL-DL configuration of the SCell is different from the TDD UL-DL configuration of the PCell;
    receiving Hybrid Automatic Repeat Request Acknowledgement/Negative Acknowledgement (HARQ-ACK) information in an uplink subframe n for a cell, wherein the uplink subframe n corresponds to a subframe n−k of a Physical Downlink Shared Channel (PDSCH), wherein a set K includes one or more values of k such that the subframe n−k corresponds to a downlink subframe or a special subframe for the cell; wherein
    the set K for the PCell is determined based on the TDD UL-DL configuration of the PCell and the set K for the SCell is determined based on a TDD UL-DL configuration determined based on the TDD UL-DL configuration of the PCell and the TDD UL-DL configuration of the SCell.

* * * * *